(12) United States Patent
Yoshida et al.

(10) Patent No.: US 8,879,443 B2
(45) Date of Patent: Nov. 4, 2014

(54) TERMINAL, BASE STATION, RESPONSE METHOD, AND RETRANSMISSION CONTROL METHOD

(75) Inventors: Tadashi Yoshida, Ishikawa (JP); Masaru Fukuoka, Ishikawa (JP); Takashi Iwai, Ishikawa (JP); Akihiko Nishio, Kanagawa (JP); Seigo Nakao, Kanagawa (JP); Masayuki Hoshino, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 316 days.

(21) Appl. No.: 13/522,806

(22) PCT Filed: Feb. 3, 2011

(86) PCT No.: PCT/JP2011/000613
§ 371 (c)(1),
(2), (4) Date: Jul. 18, 2012

(87) PCT Pub. No.: WO2011/096221
PCT Pub. Date: Aug. 11, 2011

(65) Prior Publication Data
US 2012/0294256 A1  Nov. 22, 2012

(30) Foreign Application Priority Data

Feb. 4, 2010  (JP) .................................. 2010-023308

(51) Int. Cl.
*H04B 7/00* (2006.01)
*H04W 4/00* (2009.01)
(Continued)

(52) U.S. Cl.
CPC ............. *H04L 1/16* (2013.01); *H04W 72/0413* (2013.01); *H04L 1/1635* (2013.01);
(Continued)

(58) Field of Classification Search
CPC ....... H04L 1/16; H04L 1/1635; H04L 1/1864; H04L 1/1854; H04L 5/0055; H04W 28/20; H04W 72/0413
USPC ............... 370/310, 328, 329, 338; 455/422.1, 455/426.1, 450, 451, 452.1, 452.2
See application file for complete search history.

(56) References Cited

U.S. PATENT DOCUMENTS

| | | | |
|---|---|---|---|
| 8,514,883 B2* | 8/2013 | Pan et al. | 370/468 |
| 8,775,909 B2* | 7/2014 | Ogawa et al. | 714/776 |
| 2012/0026892 A1* | 2/2012 | Nakao et al. | 370/242 |

OTHER PUBLICATIONS

Nakamura, "International Preliminary Report on Patentability (PCT/JP2011/000613)", Feb. 4, 2010, all pages.*

(Continued)

*Primary Examiner* — Kwang B Yao
*Assistant Examiner* — Adam Duda
(74) *Attorney, Agent, or Firm* — Pearne & Gordon LLP

(57) ABSTRACT

Disclosed are a terminal, a base station, a response method, and a retransmission control method, which are capable of switching the response signal transmission method while preventing throughput degradation and without increasing the number of signaling bits. A bundling determination unit (132) of a terminal (100) determines parameters that denote the allocated resource quantities that are allocated thereto from a base station (200), or in other words, a downstream band that is included in a bundling group and a downstream band that is not included in the bundling group, from among a plurality of downstream bands on the basis of base station transmission parameters. Specifically, a degree of resource share (Xn) that is allocated from each respective downstream band to the terminal (100) is employed in the base station transmission parameters.

20 Claims, 14 Drawing Sheets

(51) Int. Cl.
*H04W 72/00* (2009.01)
*H04L 1/16* (2006.01)
*H04W 28/20* (2009.01)
*H04L 1/18* (2006.01)
*H04W 72/04* (2009.01)
*H04L 5/00* (2006.01)

(52) U.S. Cl.
CPC ............ *H04W 28/20* (2013.01); *H04L 1/1864* (2013.01); *H04L 1/1854* (2013.01); *H04L 5/0055* (2013.01)
USPC ........ 370/310; 370/329; 455/422.1; 455/450; 455/451

(56) References Cited

OTHER PUBLICATIONS

R1-094238, NTT DOCOMO, "PUCCH Design for Carrier Aggregation in LTE-Advanced", 3GPP TSG RAN WG1 Meeting #58bis, Miyazaki, Japan, Oct. 12-16, 2009.
R1-100013, Catt, "Multi-channel Transmission for UL Ack/Nack in LTE-A", 3GPP TSG RAN WG1 Meeting #59bis, Valencia, Spain, Jan. 18-22, 2012.
International Search Report for application PCT/JP2011/00613 dated Mar. 8, 2012.

* cited by examiner

TERMINAL, BASE STATION, RESPONSE METHOD, AND RETRANSMISSION CONTROL METHOD

TECHNICAL FIELD

The present invention relates to a terminal, a base station, a response method and a retransmission control method.

BACKGROUND ART

3GPP LTE-Advanced which is an evolved version of LTE is studying Carrier-Aggregation that performs transmission/reception by bundling a plurality of LTE bands to realize faster transmission (e.g., see Non-Patent Literature 1). LTE terminals detect whether or not a downlink data channel (PDSCH) signal has been received without errors and transmit a response signal thereof (ACK/NACK) to a base station using an uplink control channel (PUCCH). An ACK/NACK transmission method considered in the case of Carrier-Aggregation will be described using FIG. 1.

A terminal individually receives downlink data (PDSCH) for each component band and performs error detection on each piece of data. The terminal transmits the error detection result (response signal) to the base station in an uplink component band corresponding to a downlink component band used to transmit the downlink data through PUCCH. In such a case, when a response signal of each component band is individually transmitted in each uplink component band (Non-Bundling), there is a problem that a single-carrier characteristic collapses, that is, a problem that the amount of interference in PUCCH increases. In order to solve these problems, a response signal transmission method (bundling) is available which bundles a plurality of response signals into one piece by ANDing the plurality of response signals ("1" in the case of ACK and "0" in the case of NACK) and transmits the bundled response signal. However, since the plurality of response signals are ANDed in bundling, if even one NACK is included, the base station recognizes that responses of all bundled data are NACKs and retransmits all the data, resulting in a problem of throughput degradation.

The above-described component band may be defined by a physical cell number and a carrier frequency number, and the component band is sometimes called "cell."

CITATION LIST

Non-Patent Literature

NPL 1
R1-094238, NTT DOCOMO, "PUCCH Design for Carrier Aggregation in LTE-Advanced", 3GPP TSG RAN WG1 Meeting #58bis, Miyazaki, Japan, Oct. 12-16, 2009

SUMMARY OF INVENTION

Technical Problem

The base station statically instructs the terminal on a transmission method as to whether or not to perform bundling of ACK/NACK. Alternatively, when dynamically switching the transmission method, the base station adds information on switching thereof to a downlink control channel (PDCCH) to report the transmission method to each terminal. On the other hand, the terminal statically or dynamically transmits ACK/NACK using the transmission method instructed by the base station.

However, when signals are always transmitted individually without bundling, interference in PUCCH may increase, adversely affecting the reception characteristic. On the other hand, when bundling is always performed, retransmission overhead increases and system throughput degrades. Furthermore, when dynamically switching whether or not to perform bundling, the number of signaling bits from the base station to each terminal increases and a new control channel format needs to be added.

It is an object of the present invention to provide a terminal, a base station, a response method and a retransmission control method capable of switching a response signal transmission method while preventing throughput degradation and without increasing the number of signaling bits.

Solution to Problem

An aspect of a terminal according to the present invention includes a reception section that receives downlink data in a plurality of downlink component bands, an error detection section that detects an error in each piece of the downlink data, a bundling group determination section that determines downlink component bands that are included in a bundling group and downlink component bands that are not included in the bundling group from among the plurality of downlink component bands based on parameters that indicate allocated resource quantities that are allocated to the terminal from the base station, and a response signal forming section that forms a bundled response signal by bundling error detection results on downlink data of the downlink component bands included in the bundling group into one piece.

An aspect of a base station according to the present invention includes a transmission section that transmits downlink data to a terminal in a plurality of downlink component bands, a bundling group identification section that identifies downlink component bands that are included in a bundling group and downlink component bands that are not included in the bundling group from among the plurality of downlink component bands based on parameters that indicate allocated resource quantities that are allocated to the terminal, and a reception section that receives a bundled response signal obtained by the terminal by bundling error detection results in the bundling group into one piece.

An aspect of a response method according to the present invention includes a step of receiving downlink data in a plurality of downlink component bands, a step of detecting an error in each piece of the downlink data, a step of determining downlink component bands that are included in a bundling group and downlink component bands that are not included in the bundling group from among the plurality of downlink component bands based on parameters that indicate allocated resource quantities that are allocated to the terminal from a base station, and a step of forming a bundled response signal by bundling error detection results on downlink data of the downlink component bands included in the bundling group into one piece.

An aspect of a retransmission control method according to the present invention includes a step of transmitting downlink data to a terminal in a plurality of downlink component bands, a step of identifying downlink component bands that are included in a bundling group and downlink component bands that are not included in the bundling group from among the plurality of downlink component bands based on parameters that indicate allocated resource quantities that are allocated to the terminal, and a step of receiving a bundled response signal obtained by the terminal by bundling error detection results in the bundling group into one piece.

Advantageous Effects of Invention

The present invention provides a terminal, a base station, a response method and a retransmission control method capable of switching a response signal transmission method while preventing throughput degradation and without increasing the number of signaling bits.

DESCRIPTION OF EMBODIMENTS

Figure 1:
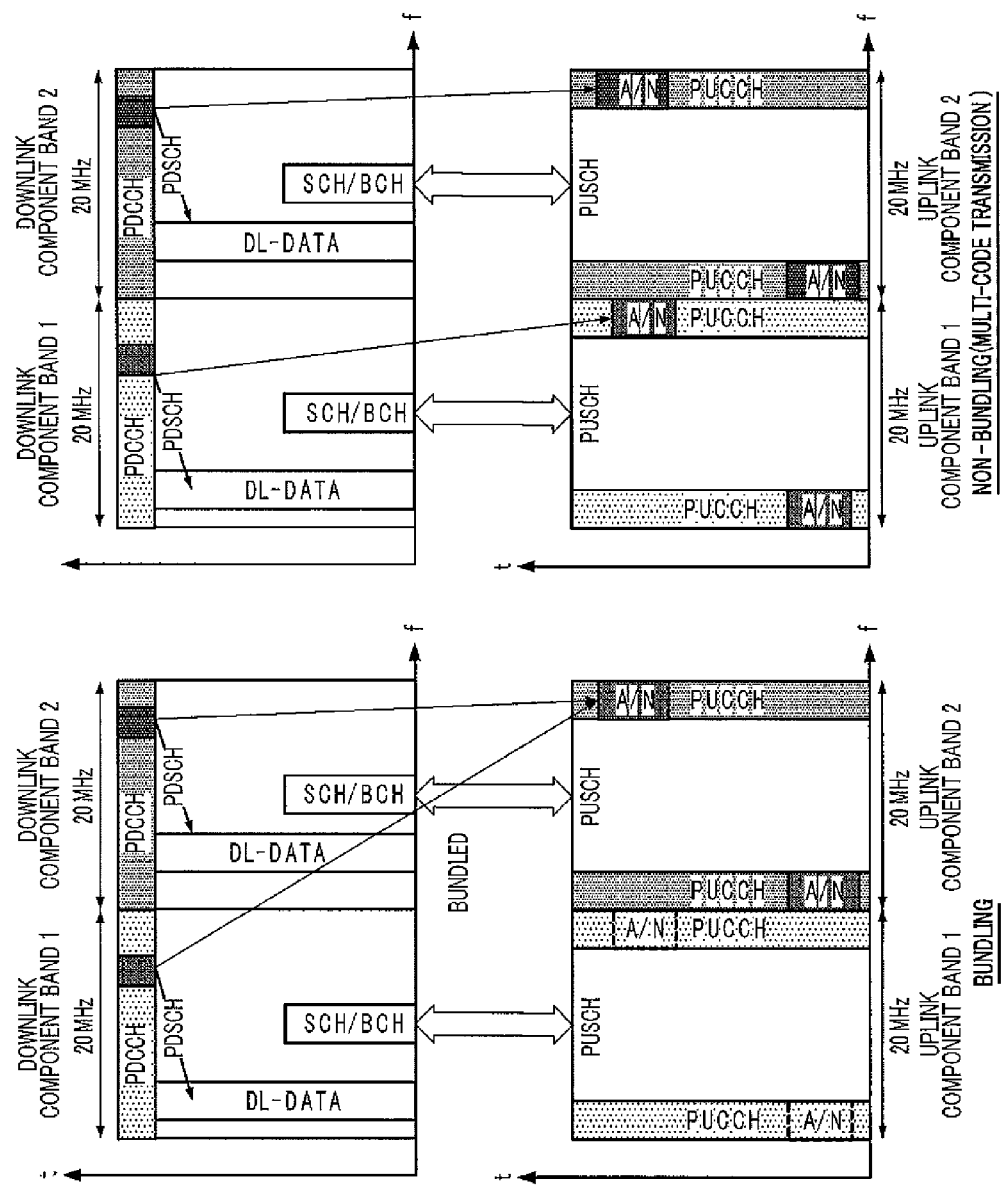
FIG. 1 is a diagram illustrating an ACK/NACK transmission method considered in the case of Carrier-Aggregation.

Hereinafter, embodiments of the present invention will be described in detail with reference to the accompanying drawings. Among the embodiments, identical components will be assigned identical reference numerals and overlapping descriptions thereof will be omitted.

Embodiment 1

Configuration of Terminal

Figure 2:
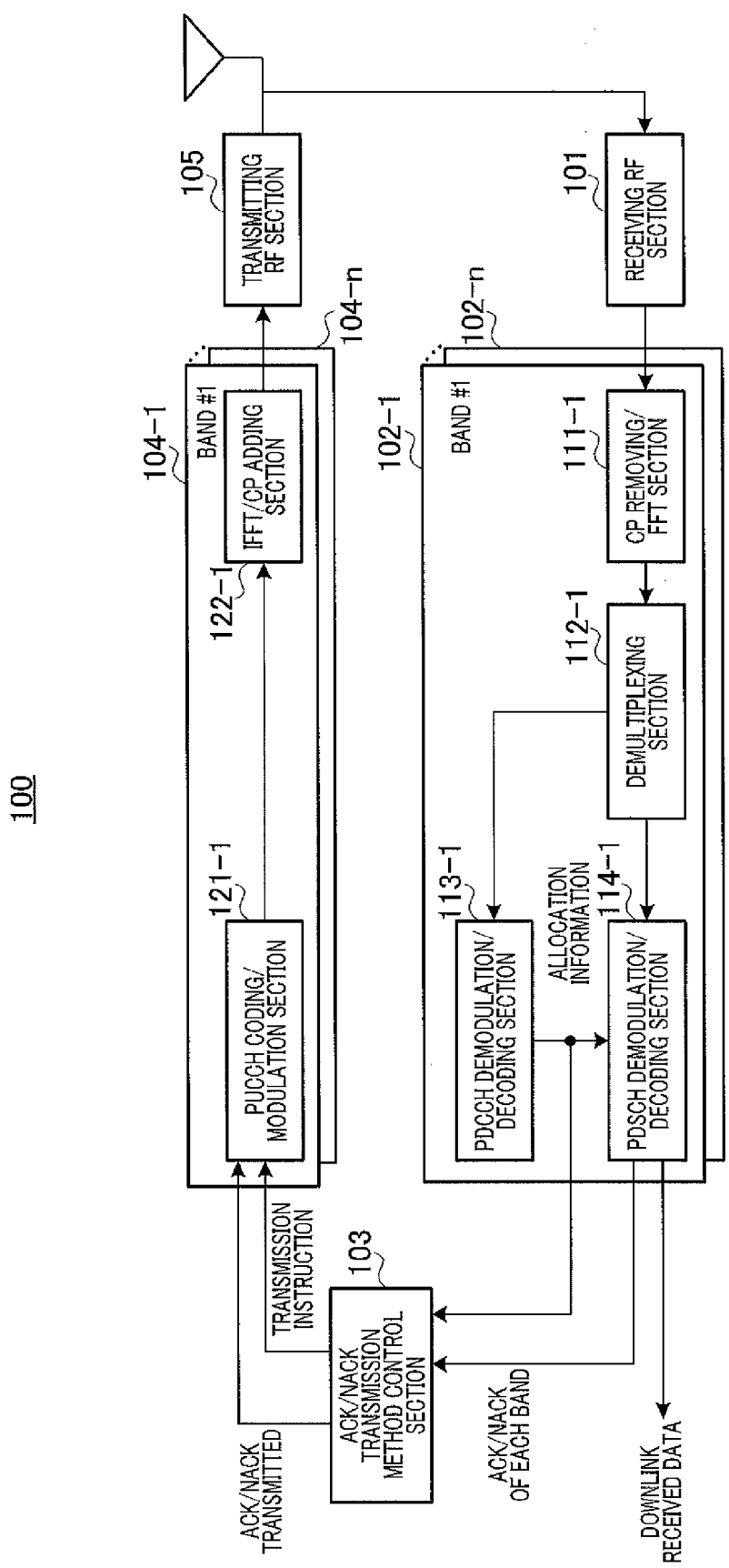
FIG. 2 is a block diagram showing a configuration of a terminal according to Embodiment 1 of the present invention.

FIG. 2 is a block diagram showing a configuration of terminal 100 according to Embodiment 1 of the present invention. In FIG. 2, terminal 100 includes receiving RF section 101, reception processing sections 102-1 to n, ACK/NACK transmission method control section 103, transmission processing sections 104-1 to n and transmitting RF section 105.

Receiving RF section 101 applies radio reception processing (down-conversion, A/D conversion or the like) to a received signal received via an antenna. This radio reception processing is performed on each downlink component band. That is, receiving RF section 101 also performs processing of demultiplexing the received signal into individual downlink component bands. The received signals of the respective downlink component bands (#1 to #n) obtained in receiving RF section 101 are outputted to reception processing sections 102-1 to n corresponding to downlink component bands #1 to #n respectively.

Reception processing section 102 performs reception processing on the received signals of the respective downlink component bands received from receiving RF section 101. Reception processing sections 102-1 to n perform reception processing on the received signals of downlink component bands #1 to #n respectively.

To be more specific, reception processing sections 102-1 to n each include CP (Cyclic Prefix) removing/FFT (Fast Fourier Transform) section 111, demultiplexing section 112, PDCCH demodulation/decoding section 113 and PDSCH demodulation/decoding section 114.

Since the received signal here is an OFDM signal, CP removing/FFT section 111 removes a CP component from the received signal and applies FFT processing to the received signal after the CP removal to thereby transform the signal into a frequency-domain signal. This frequency-domain received signal is outputted to demultiplexing section 112.

Demultiplexing section 112 demultiplexes the received signal after the FFT into a control signal (PDCCH) and a data signal (PDSCH). The control signal (PDCCH) is outputted to PDCCH demodulation/decoding section 113, whereas the data signal (PDSCH) is outputted to PDSCH demodulation/decoding section 114.

PDCCH demodulation/decoding section 113 demodulates and then decodes PDCCH and extracts resource allocation information from the decoding result. This resource allocation information is outputted to PDSCH demodulation/decoding section 114 and ACK/NACK transmission method control section 103.

PDSCH demodulation/decoding section 114 extracts PDSCH data directed to terminal 100 from the data signal (PDSCH) received from demultiplexing section 112 based on the resource allocation information received from PDCCH demodulation/decoding section 113. Furthermore, PDSCH demodulation/decoding section 114 performs demodulation and then error correcting decoding on the extracted PDSCH data to thereby acquire received data. Furthermore, PDSCH demodulation/decoding section 114 outputs the error detection result to the ACK/NACK transmission method control section.

The above-described processing of CP removing/FFT section 111, demultiplexing section 112, PDCCH demodulation/decoding section 113, and PDSCH demodulation/decoding section 114 is performed on the received signal of each downlink component band. Therefore, the error detection result of each downlink component band and the resource allocation information of each downlink component band are outputted to ACK/NACK transmission method control section 103.

ACK/NACK transmission method control section 103 determines a downlink component band group constituting a bundling group based on the resource allocation information received from reception processing section 102. Furthermore, ACK/NACK transmission method control section 103 determines an uplink component band for transmitting a response signal of the bundling group based on the resource allocation information received from reception processing section 102. That is, ACK/NACK transmission method control section 103 determines a downlink component band group constituting the bundling group and an uplink component band for transmitting a response signal of the bundling group based on parameters that indicate allocated resource quantities that are allocated to terminal 100 from base station 200 (hereinafter simply referred to as "base station transmission parameters").

ACK/NACK transmission method control section 103 forms a bundled response signal by bundling a plurality of error detection results obtained about the downlink component band group constituting this bundling group into one piece. Furthermore, ACK/NACK transmission method control section 103 performs control of transmitting this bundled response signal in the uplink component band determined above. This control is performed by outputting a transmission command signal and the bundled response signal to transmission processing section 104 corresponding to the uplink component band determined above.

ACK/NACK transmission method control section 103 performs control of individually forming response signals for error detection results obtained about downlink component bands not included in the bundling group and transmitting response signals in uplink component bands corresponding to the downlink component bands. To be more specific, ACK/NACK transmission method control section 103 outputs the response signals and transmission command signals to transmission processing section 104 corresponding to the uplink component bands.

Figure 3:
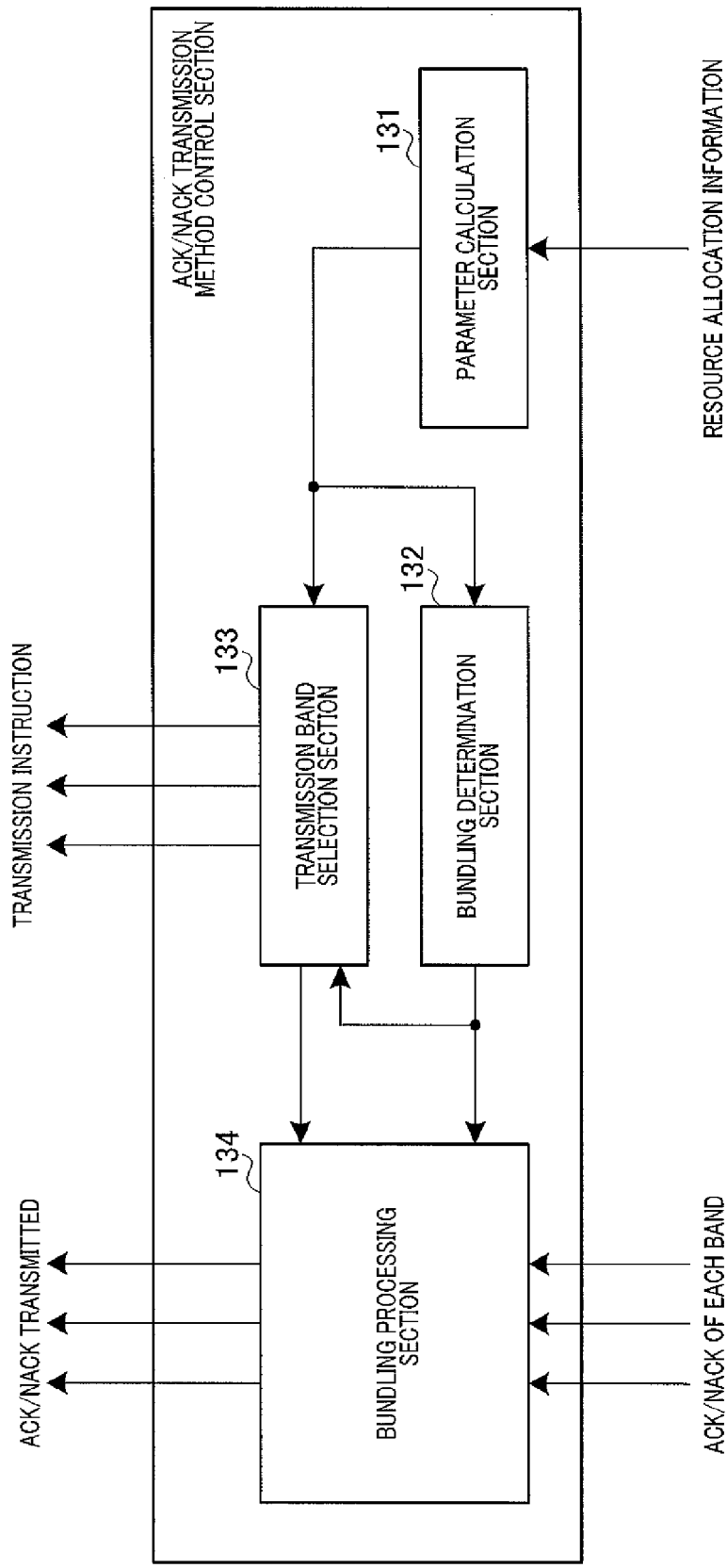
FIG. 3 is a block diagram showing a configuration of an ACK/NACK transmission method control section.

To be more specific, as shown in FIG. 3, ACK/NACK transmission method control section 103 includes parameter calculation section 131, bundling determination section 132, transmission band selection section 133 and bundling processing section 134.

Parameter calculation section 131 calculates a "base station transmission parameter" based on the resource allocation information. This parameter becomes determination criteria of bundling determination section 132 and selection criteria of transmission band selection section 133. Embodiment 1 uses occupancy of allocated resource Xn that is allocated to terminal 100 in each downlink component band as this parameter. Details of calculation of this parameter will be described later.

Bundling determination section 132 compares the parameter value of the downlink component band calculated in parameter calculation section 131 with predetermined threshold Xth stored beforehand and determines whether or not to include the downlink component band in the bundling group based on this comparison result. This determination is made for each downlink component band.

Bundling determination section 132 outputs the bundling group information (that is, information indicating downlink component bands constituting the bundling group) to transmission band selection section 133 and bundling processing section 134.

Transmission band selection section 133 selects an uplink component band to be used to transmit a bundled response signal based on the bundling group information received from bundling determination section 132 and a selection rule. The uplink component band used to transmit this bundled response signal is selected from the uplink component band group corresponding to the downlink component band group constituting the bundling group. Furthermore, a rule is used according to which an uplink component band corresponding to a downlink component band having the largest calculated parameter value is selected as the above-described selection rule here.

Transmission band selection section 133 outputs information indicating the selected uplink component band (that is, selected band information) to bundling processing section 134 and outputs a transmission command signal to transmission processing section 104 corresponding to the selected uplink component band. A transmission command signal is also outputted to transmission processing section 104 corresponding to downlink component bands that are not included in the bundling group.

Bundling processing section 134 forms a bundled response signal by bundling error detection results of the plurality of downlink component bands included in the bundling group into one piece based on the bundling group information received from bundling determination section 132. Bundling processing section 134 outputs this bundled response signal to transmission processing section 104 corresponding to the uplink component band indicated by the selected band information received from transmission band selection section 133. Bundling processing section 134 outputs error detection results of downlink component bands that are not included in the bundling group to transmission processing section 104 corresponding to the uplink component bands corresponding to the downlink component bands as they are.

Returning to FIG. 2, transmission processing section 104 transmits a response signal received from ACK/NACK transmission method control section 103 (including a bundled response signal and an unbundled response signal) in an uplink component band indicated by the transmission command signal. Transmission processing sections 104-1 to n perform processing on respective response signals of uplink component bands #1 to #n corresponding to downlink component bands #1 to #n.

To be more specific, transmission processing sections 104-1 to n each include PUCCH coding/modulation section 121 and IFFT (Inverse Fast Fourier Transform)/CP adding section 122.

PUCCH coding/modulation section 121 decodes and modulates a response signal based on a transmission command signal and outputs the response signal to IFFT/CP adding section 122. PUCCH coding/modulation section 121 maps the modulated signal to a frequency (subcarrier) position indicated beforehand from base station 200, which will be described later, and outputs the mapped signal to IFFT/CP adding section 122.

IFFT/CP adding section 122 performs IFFT processing on the signal received from PUCCH coding/modulation section 121 and adds a CP. An OFDM signal is obtained in this way.

Transmitting RF section 105 applies radio transmission processing (D/A conversion, up-conversion, amplification or the like) to the OFDM signal obtained in IFFT/CP adding section 122 and transmits the radio signal obtained via an antenna.

[Configuration of Base Station]

Figure 4:
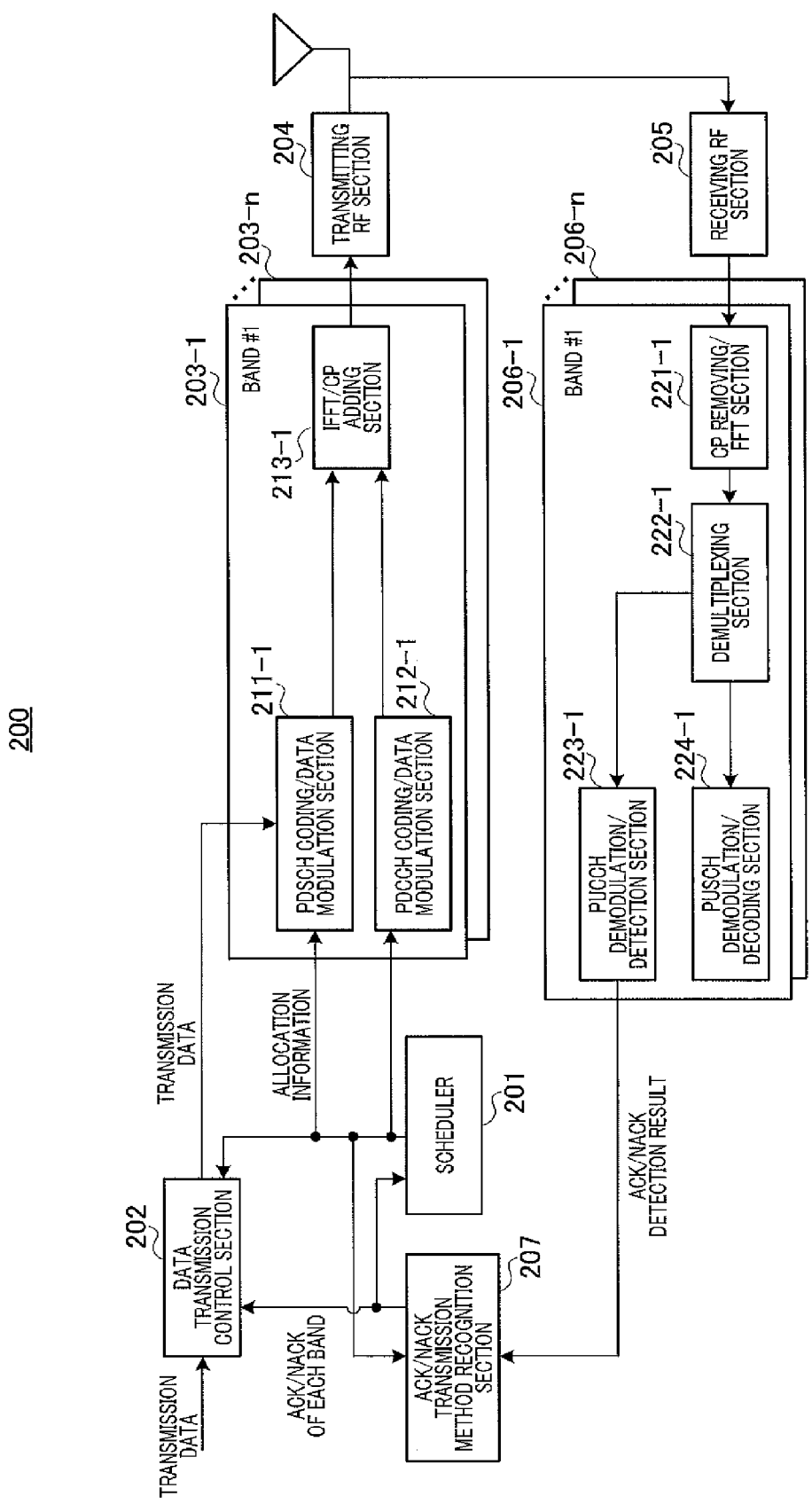
FIG. 4 is a block diagram showing a configuration of a base station according to Embodiment 1 of the present invention.

FIG. 4 is a block diagram showing a configuration of base station 200 according to Embodiment 1 of the present invention. In FIG. 4, base station 200 includes scheduler 201, data transmission control section 202, transmission processing sections 203-1 to n, transmitting RF section 204, receiving RF section 205, reception processing sections 206-1 to n and ACK/NACK transmission method recognition section 207.

Scheduler 201 allocates resources to data transmitted to terminal 100 to be scheduled based on the size or priority of the data transmitted to terminal 100 to be scheduled, ACK/NACK result upon previous transmission, retransmission count or channel situation or the like. Information indicating these allocated resources (that is, allocated resource information) is outputted to data transmission control section 202, transmission processing section 203 and ACK/NACK transmission method recognition section 207. This resource allocation processing is performed for each terminal 100. Here, the allocated resource information also includes information indicating a component band group used for carrier aggregation communication with terminal 100 to be scheduled. This component band group includes a plurality of downlink component bands.

Data transmission control section 202 stores transmission data upon initial transmission and outputs the transmission data to transmission processing section 203 corresponding to the downlink component band indicated by the allocated resource information. Upon receiving NACK as a response signal, data transmission control section 202 outputs the stored data corresponding to the NACK to transmission processing section 203 corresponding to the downlink component band indicated by the allocated resource information. Upon receiving ACK as the response signal, data transmission control section 202 deletes the stored data corresponding to the ACK.

Transmission processing section 203 transmits the transmission data received from data transmission control section 202 in the downlink component band indicated by the allocation information. Transmission processing sections 203-1 to n perform processing on the transmission data of downlink component bands #1 to #n respectively.

To be more specific, transmission processing section 203 includes PDSCH coding/data modulation section 211, PDCCH coding/data modulation section 212 and IFFT/CP adding section 213.

PDSCH coding/data modulation section 211 performs error correcting coding and then modulation on the input data and maps the modulated signal at a frequency (subcarrier) position indicated by the allocation information and outputs the mapped modulated signal to IFFT/CP adding section 213.

PDCCH coding/data modulation section 212 receives the downlink control data including the allocated resource information, performs error correcting coding and then modulation on the input data, maps the modulated signal at a predetermined frequency (subcarrier) position and outputs the mapped modulated signal to IFFT/CP adding section 213.

IFFT/CP adding section 213 applies IFFT processing to the signal received from PDSCH coding/data modulation section 211 and PDCCH coding/data modulation section 212 and adds a CP thereto. An OFDM signal is obtained in this way.

Transmitting RF section 204 applies radio transmission processing (D/A conversion, up-conversion, amplification or the like) to the OFDM signal obtained in IFFT/CP adding section 213 and transmits the radio signal obtained via an antenna.

Receiving RF section 205 applies radio reception processing (down-conversion, A/D conversion or the like) to the received signal received via the antenna. This radio reception processing is performed for each uplink component band. That is, receiving RF section 205 also performs processing of demultiplexing the received signal into individual uplink component bands. The received signals of the respective uplink component bands (#1 to #n) obtained in receiving RF section 205 are outputted to reception processing sections 206-1 to n corresponding to uplink component bands #1 to #n.

Reception processing section 206 performs reception processing on the received signal of each uplink component band received from receiving RF section 205. Reception processing sections 206-1 to n perform reception processing on the received signals of uplink component bands #1 to #n respectively.

To be more specific, reception processing sections 206-1 to n each include CP removing/FFT section 221, demultiplexing section 222, PUCCH demodulation/detection section 223 and PUSCH demodulation/decoding section 224.

Since the received signal is an OFDM signal, CP removing/FFT section 221 removes a CP component from the received signal and applies FFT processing to the received signal after the CP removal to thereby transform the received signal into a frequency-domain signal. This frequency domain received signal is outputted to demultiplexing section 222.

Demultiplexing section 222 demultiplexes the received signal after the FFT into a control signal (PUCCH) and a data signal (PUSCH). The control signal (PUCCH) is outputted to PUCCH demodulation/detection section 223, whereas the data signal (PUSCH) is outputted to PUSCH demodulation/decoding section 224.

PUCCH demodulation/detection section 223 decodes PUCCH and detects a response signal (ACK/NACK) included in PUCCH.

PUSCH demodulation/decoding section 224 decodes and demodulates PUSCH to thereby obtain uplink data.

The processing in CP removing/FFT section 221, demultiplexing section 222, PUCCH demodulation/detection section 223, and PUSCH demodulation/decoding section 224 described above is performed on a received signal of each uplink component band. Therefore, the ACK/NACK detection result of each uplink component band is outputted to ACK/NACK transmission method recognition section 207.

ACK/NACK transmission method recognition section 207 determines a downlink component band group constituting a bundling group based on the resource allocation information received from scheduler 201. Furthermore, ACK/NACK transmission method recognition section 207 determines an uplink component band for receiving a response signal of the bundling group based on the resource allocation information received from scheduler 201. That is, ACK/NACK transmission method recognition section 207 determines a downlink component band group constituting the bundling group and an uplink component band for receiving a response signal of the bundling group based on "base station transmission parameters." The determining processing of determining the downlink component band group constituting the bundling group and the determining processing of determining the uplink component band for receiving a response signal of the bundling group are performed for each terminal 100 to be processed. The downlink component band group constituting the bundling group and the uplink component band for receiving the response signal of the bundling group determined in this way match those determined in terminal 100 corresponding to the allocated resource information.

ACK/NACK transmission method recognition section 207 determines the ACK/NACK detection result received from reception processing section 206 corresponding to the uplink component band whereby a bundled response signal is to be transmitted from terminal 100, and outputs ACK or NACK corresponding to the determination result to data transmission control section 202 for each downlink component band included in the bundling group. Furthermore, ACK/NACK transmission method recognition section 207 determines the ACK/NACK detection result obtained for downlink component bands that are not included in the bundling group and outputs ACK or NACK in response to the determination result to data transmission control section 202 as is.

Figure 5:
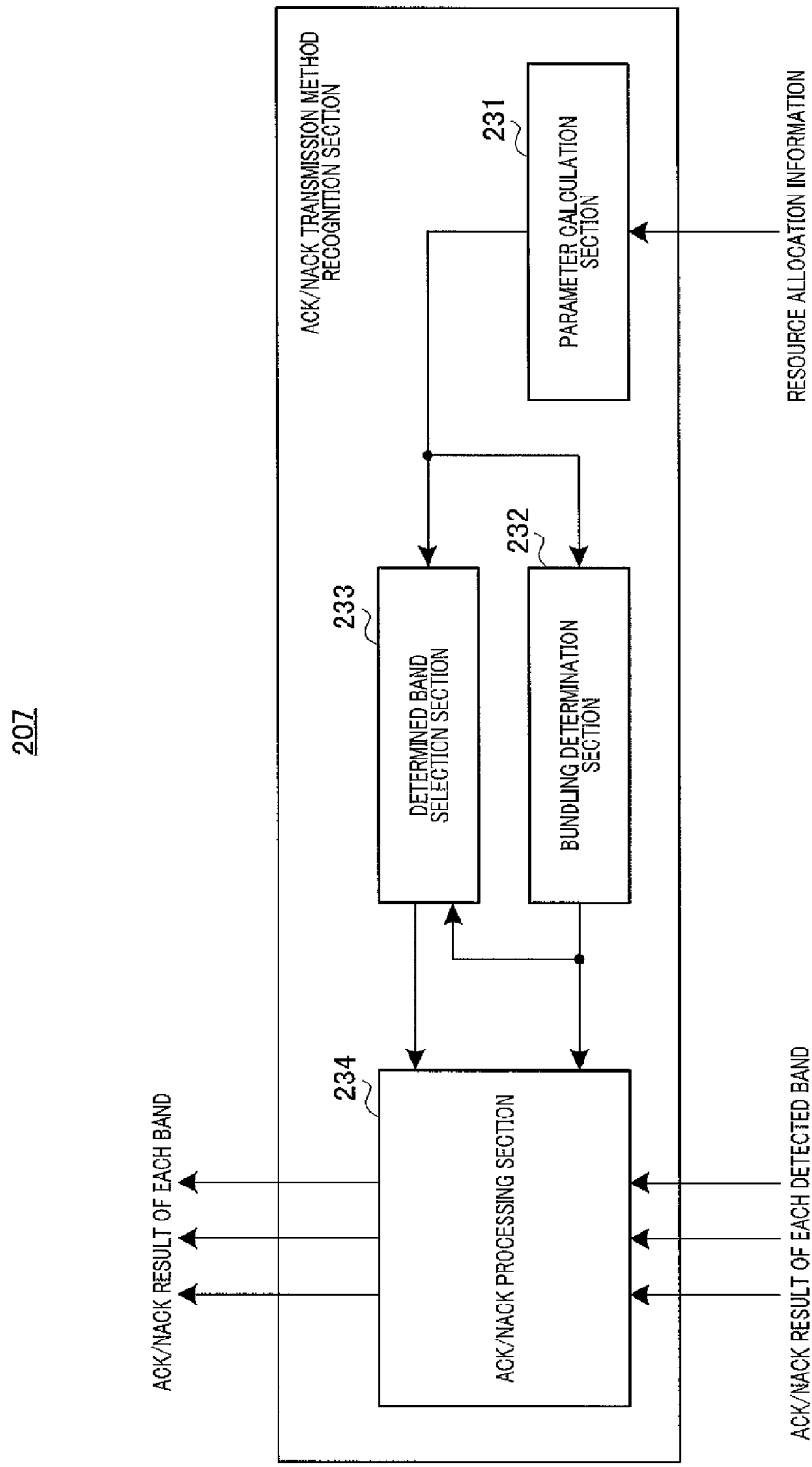
FIG. 5 is a block diagram showing a configuration of an ACK/NACK transmission method recognition section.

To be more specific, as shown in FIG. 5, ACK/NACK transmission method recognition section 207 includes parameter calculation section 231, bundling determination section 232, determined band selection section 233 and ACK/NACK processing section 234.

Parameter calculation section 231 calculates a transmission parameter of base station 200 indicating allocated resource quantities based on the resource allocation information. This parameter becomes determination criteria of bundling determination section 232 and selection criteria of determined band selection section 233. Embodiment 1 uses occupancy of allocated resource Xn allocated to terminal 100 in each downlink component band as this parameter. Details of calculation of this parameter will be described later.

Bundling determination section 232 compares the parameter value of the downlink component band calculated in parameter calculation section 231 with predetermined threshold Xth stored beforehand and determines whether or not to include the downlink component band in the bundling group based on this comparison result. This determination is made for each downlink component band.

Bundling determination section 232 outputs the bundling group information (that is, information indicating the downlink component band constituting the bundling group) to determined band selection section 233 and ACK/NACK processing section 234.

Determined band selection section 233 selects an uplink component band used to transmit the bundled response signal in terminal 100 based on the bundling group information received from bundling determination section 232 and a selection rule. The uplink component band used to transmit this bundled response signal is selected from among the uplink component band group corresponding to the downlink component band group constituting the bundling group. Furthermore, a rule is used according to which an uplink component band corresponding to a downlink component band having the largest calculated parameter value is selected as the above-described selection rule.

Determined band selection section 233 outputs information indicating the selected uplink component band (that is, selected band information) to ACK/NACK processing section 234.

ACK/NACK processing section 234 determines the ACK/NACK detection result received from reception processing section 206 corresponding to the uplink component band indicated by the selected band information and outputs ACK or NACK corresponding to the determination result to data transmission control section 202 for each downlink component band included in the bundling group. Furthermore, ACK/NACK processing section 234 determines the ACK/NACK detection result obtained for downlink component bands that are not included in the bundling group and outputs ACK or NACK corresponding to the determination result to data transmission control section 202 as is.

[Operation of Terminal 100 and Base Station 200]

Figure 6:
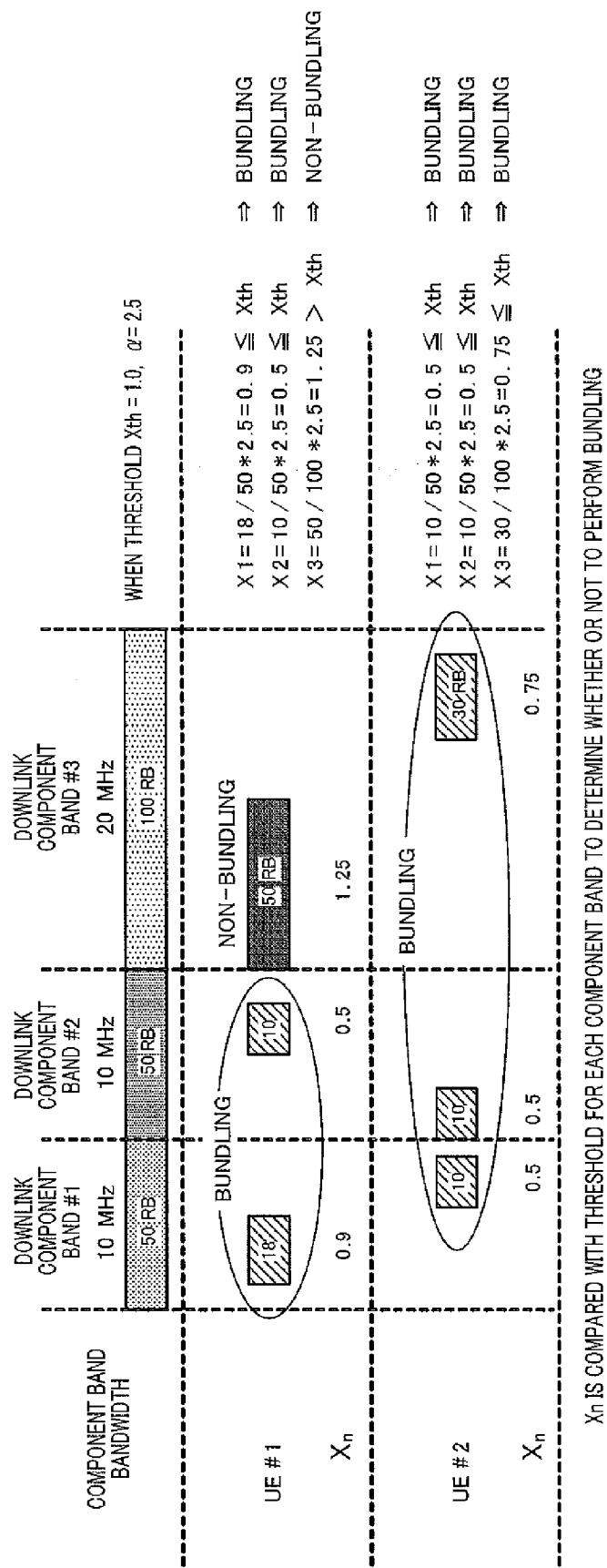
FIG. 6 is a diagram illustrating operation of the terminal and the base station.

Operation of terminal 100 and base station 200 having the above-described configuration will be described. Here, for simplicity of description, a case will be described here as an example where downlink data is transmitted from base station 200 to terminal 100 as shown in FIG. 6 using three downlink component bands #1 to #3. In FIG. 6, downlink component bands #1 to #3 include 50, 50 and 100 resource blocks (RBs) in bandwidths of 10 MHz, 10 MHz and 20 MHz respectively. Therefore, the total bandwidth used for data transmission to terminal 100 is 40 MHz.

In terminal 100, parameter calculation section 131 calculates a "base station transmission parameter" based on the resource allocation information. Here, the "base station transmission parameter" is calculated according to following equation 1.

$$Xn = (\text{number of RBs allocated in an } n\text{-th band}) \div (\text{total number of RBs in } n\text{-th band}) \times \alpha \quad \text{(Equation 1)}$$

That is, in an arbitrary downlink component band among the three downlink component bands, the ratio of the bandwidth allocated to terminal 100 to the bandwidth of the arbitrary downlink component band, that is, the occupancy is calculated according to equation 1. Here, $\alpha$ in equation 1 is a parameter used to calculate occupancy Xn. This $\alpha$ may also be individually set for each cell, each terminal 100 or each downlink component band.

In FIG. 6, 18 RBs are allocated to first terminal 100 (UE#1) in downlink component band #1, 10 RBs are allocated in downlink component band #2 and 50 RBs are allocated in downlink component band #3. Therefore, when $\alpha=2.5$, occupancies Xn in downlink component bands #1 to #3 are 0.9, 0.5 and 1.25 respectively. Similarly, regarding second terminal 100 (UE#2), occupancies Xn in downlink component bands #1 to #3 are 0.5, 0.5 and 0.75 respectively.

Next, bundling determination section 132 compares the parameter value of the downlink component band calculated in parameter calculation section 131 with predetermined threshold Xth stored beforehand and determines whether or not to include the downlink component band in the bundling group based on this comparison result.

To be more specific, when threshold Xth=1.0, regarding UE#1, bundling determination section 132 includes downlink component band #1 and downlink component band #2 for which the parameter value calculated in parameter calculation section 131 is equal to or below threshold Xth in the bundling group as shown in FIG. 6. On the other hand, bundling determination section 132 does not include downlink component band #3 for which the parameter value calculated in parameter calculation section 131 is above threshold Xth in the bundling group.

When threshold Xth=1.0, regarding UE#2, since the parameter values calculated in parameter calculation section 131 are equal to or below threshold Xth for all downlink component bands #1 to #3 as shown in FIG. 6, bundling determination section 132 includes all downlink component bands #1 to #3 in the bundling group.

Furthermore, transmission band selection section 133 selects an uplink component band used to transmit a bundled response signal based on the bundling group information received from bundling determination section 132 and a selection rule. Here, a rule is used according to which an uplink component band corresponding to a downlink component band having the largest calculated parameter value is selected.

Figure 7:
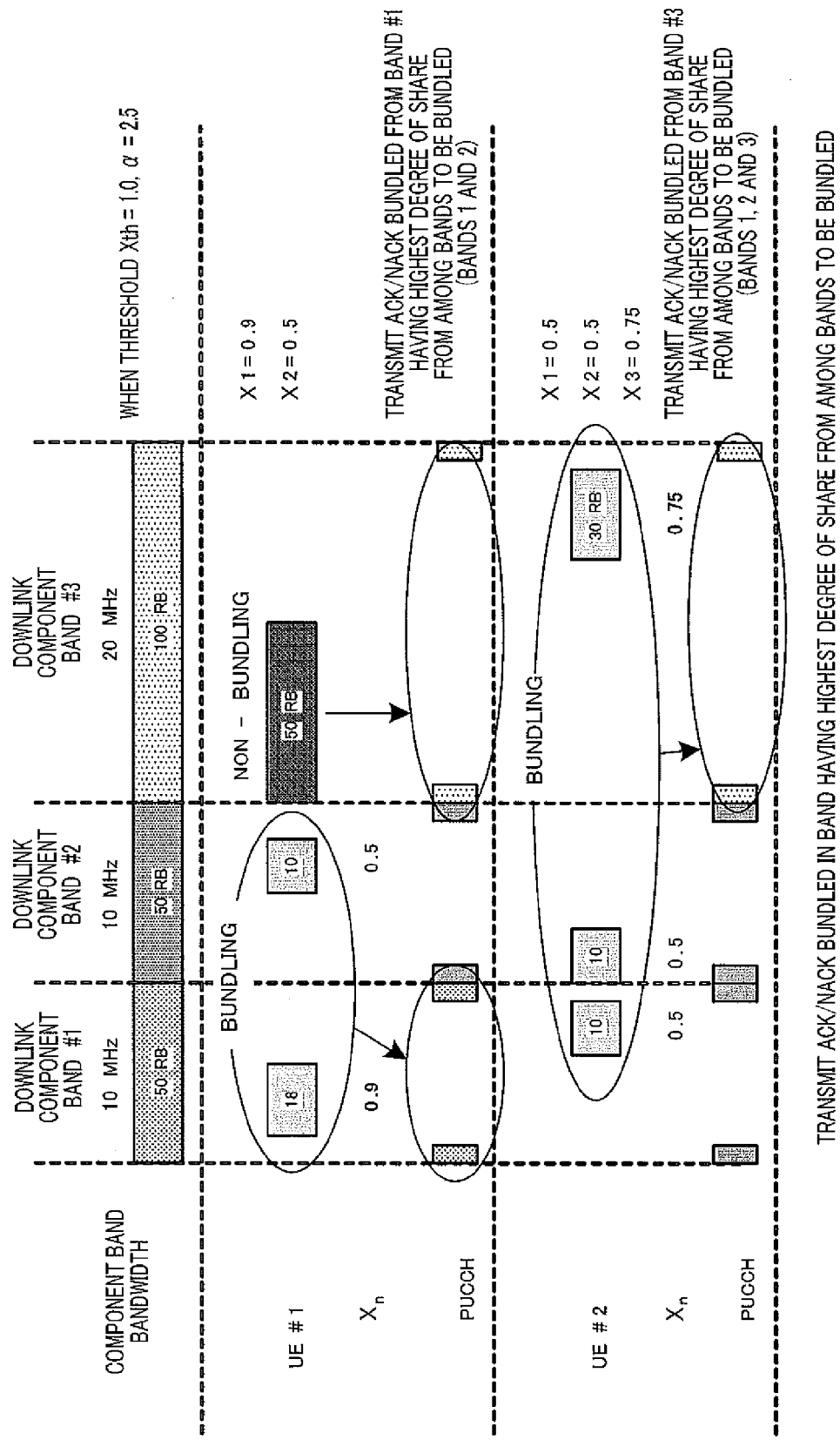
FIG. 7 is a diagram illustrating operation of the terminal and the base station.

To be more specific, in UE#1, transmission band selection section 133 selects an uplink component band corresponding to downlink component band #1 having a higher occupancy Xn among downlink component bands #1 and #2 included in the bundling group as shown in FIG. 7 as the uplink component band used to transmit the bundled response signal.

On the other hand, in UE#2, transmission band selection section 133 selects an uplink component band corresponding to downlink component band #3 having a higher occupancy Xn among downlink component bands #1, #2 and #3 included in the bundling group as shown in FIG. 7 as the uplink component band used to transmit the bundled response signal.

Next, bundling processing section 134 forms a bundled response signal by bundling error detection results of a plurality of downlink component bands determined by bundling determination section 132 to be included in the bundling group into one piece. Furthermore, bundling processing section 134 outputs the formed bundled response signal to transmission processing section 104 corresponding to the uplink component band selected in transmission band selection section 133. That is, bundling processing section 134 forms a bundled response signal by bundling error detection results of the plurality of downlink component bands constituting the bundling group into one piece and performs control of transmitting the bundled response signal in an uplink component band selected in transmission band selection section 133.

Here, as described above, when an error is detected even in one downlink component band in the bundling group, retransmission is performed in all downlink component bands included in the bundling group, resulting in a problem that system throughput is degraded. On the other hand, by including only downlink component bands whose occupancy Xn is equal to or below predetermined threshold Xth in the bundling group, downlink data for which a retransmission request is transmitted to base station 200 by the bundled response signal can be limited to data in a small size. Even when retransmission is executed in all downlink component bands included in the bundling group, system throughput degradation can be minimized.

Furthermore, as described above, an uplink component band corresponding to the downlink component band having the greatest occupancy Xn is selected from among a plurality of downlink component bands included in the bundling group as an uplink component band for transmitting the bundled response signal. It is thereby possible to reduce interference from other response signals with the bundled response signal. This is because since in a downlink component band having a high occupancy Xn, bands allocated to other users are small, the number of response signals transmitted in an uplink component band corresponding to the downlink component band is also assumed to be small. As a result, it is possible to improve the accuracy of retransmission control.

On the other hand, base station 200 receives a response signal (including a bundled response signal and an unbundled response signal) transmitted from terminal 100 and performs retransmission control according to contents of the response signal as described above. Here, base station 200 can identify an uplink component band and bundling group through which the bundled response signal is transmitted from terminal 100 using a method similar to the method of determining an uplink component band used to transmit the bundling group and bundled response signal in terminal 100. Therefore, base station 200 handles the response signal received in the uplink component band as a bundled response signal, and can thereby perform retransmission control of downlink data in the downlink component bands included in the bundling group based on the contents (ACK or NACK) of the bundled response signal.

To be more specific, base station 200 calculates a "base station transmission parameter" based on the resource allocation information. Here, the "base station transmission parameter" is also calculated based on equation 1 above.

Bundling determination section 232 compares the parameter value of the downlink component band calculated in parameter calculation section 231 with predetermined threshold Xth stored beforehand and determines whether or not to include the downlink component band in the bundling group based on the comparison result.

Determined band selection section 233 selects an uplink component band used to transmit the bundled response signal in terminal 100 based on the bundling group information received from bundling determination section 232 and a selection rule. Here, a rule is used according to which an uplink component band corresponding to a downlink component band having the largest calculated parameter value is selected.

ACK/NACK processing section 234 determines the ACK/NACK detection result received from reception processing section 206 corresponding to the uplink component band indicated by the selected band information and outputs ACK or NACK corresponding to the determination result to data transmission control section 202 for each downlink component band included in the bundling group.

When FIGS. 6 and 7 are taken as examples for description, regarding UE#1, ACK/NACK processing section 234 handles the response signal received in uplink component band #1 as a bundled response signal. That is, when the bundled response signal received in uplink component band #1 indicates NACK, ACK/NACK processing section 234 outputs NACK to data transmission control section 202 for each downlink component band included in the bundling group. In this way, data retransmission is performed in all downlink component bands included in the bundling group.

Furthermore, regarding UE#1, ACK/NACK processing section 234 handles the response signal received in uplink component band #3 as an unbundled response signal. That is, when the response signal received in uplink component band #3 indicates NACK, ACK/NACK processing section 234 outputs NACK for downlink component band #3 corresponding to uplink component band #3 to data transmission control section 202. Data retransmission in downlink component band #3 is performed in this way.

As described above, both base station 200 and terminal 100 can individually identify a bundling group and an uplink component band used to transmit a bundled response signal based on resource allocation information normally transmitted from base station 200 to terminal 100 and the same rule, and therefore new signaling need not be added.

According to the present embodiment as described above, bundling determination section 132 in terminal 100 determines downlink component bands that are included in a bundling group and downlink component bands that are not included in the bundling group from among a plurality of downlink component bands based on a parameter indicating allocated resource quantities allocated to terminal 100 from base station 200, that is, "base station transmission parameter." To be more specific, bundling determination section 132 compares the value of the "base station transmission parameter" with threshold Xth and determines the bundling group based on the comparison result. Furthermore, occupancy of resource Xn allocated to terminal 100 in each downlink component band is used as the "base station transmission parameter."

Thus, by including only downlink component bands whose occupancy Xn is equal to or below predetermined threshold Xth in the bundling group, it is possible to limit the downlink data whereby a retransmission request is transmitted to base station 200 through a bundled response signal to data in a small size. Thus, even when retransmission is performed in all downlink component bands included in the bundling group, it is possible to minimize system throughput degradation.

Furthermore, transmission band selection section 133 in terminal 100 selects an uplink component band corresponding to the downlink component band having the largest "base station transmission parameter" value from among downlink component bands included in the bundling group as an uplink component band used to transmit the bundled response signal.

Thus, interferences from other response signals with the bundled response signal can be reduced. As a result, the accuracy of retransmission control can be improved.

Parameter α may be reported from base station 200 to terminal 100 as a specific value for each cell or may be reported as an offset value for each cell. By so doing, retransmission overhead and the amount of interference in PUCCH can be appropriately controlled for each cell.

Furthermore, parameter α may be reported from base station 200 to terminal 100 as a specific value for each terminal or may be reported as an offset value for each terminal. By so doing, retransmission overhead can be appropriately controlled for each terminal.

Furthermore, parameter α may be reported from base station 200 to terminal 100 as a specific value for each downlink component band or may be reported as an offset value. By so doing, retransmission overhead or the amount of interference in PUCCH can be appropriately controlled for each band in a situation in which application such as an LTE-Advanced dedicated band or LTE shared band, or the number of users accommodated differs from one band to another.

Embodiment 2

Embodiment 2 uses a degree of distribution to each downlink component band using, as criteria, total resource quantities allocated to an arbitrary terminal among a plurality of downlink component bands as a whole used for carrier aggregation as a "base station transmission parameter."

Since basic configurations of a base station and a terminal according to Embodiment 2 are common to those in Embodiment 1, these configurations will be described using FIGS. 2 to 5.

In terminal 100 of Embodiment 2, ACK/NACK transmission method control section 103 has a function similar to that of Embodiment 1. However, as described above, Embodiment 2 is different from Embodiment 1 in that the degree of distribution to each downlink component band is used as the "base station transmission parameter."

To be more specific, in ACK/NACK transmission method control section 103, parameter calculation section 131 calculates the "base station transmission parameter" based on resource allocation information. This parameter is degree of distribution Xn to each downlink component band corresponding to the total resource quantities allocated to terminal 100.

The processing of bundling determination section 132, transmission band selection section 133 and bundling processing section 134 is similar to that in Embodiment 1 except that degree of distribution Xn to each downlink component band corresponding to the total resource quantities allocated to terminal 100 is used as criteria.

In base station 200 of Embodiment 2, ACK/NACK transmission method recognition section 207 has a function similar to that of Embodiment 1. However, Embodiment 2 is also different from Embodiment 1 in that the degree of distribution to each downlink component band is used as the "base station transmission parameter."

To be more specific, parameter calculation section 231 in ACK/NACK transmission method recognition section 207 calculates the "base station transmission parameter" based on the resource allocation information. This parameter is degree of distribution Xn to each downlink component band corresponding to the total resource quantities allocated to terminal 100.

The processing of bundling determination section 232, determined band selection section 233 and ACK/NACK processing section 234 is similar to that in Embodiment 1 except that degree of distribution Xn to each downlink component band corresponding to the total resource quantities allocated to terminal 100 is used as criteria.

Figure 8:
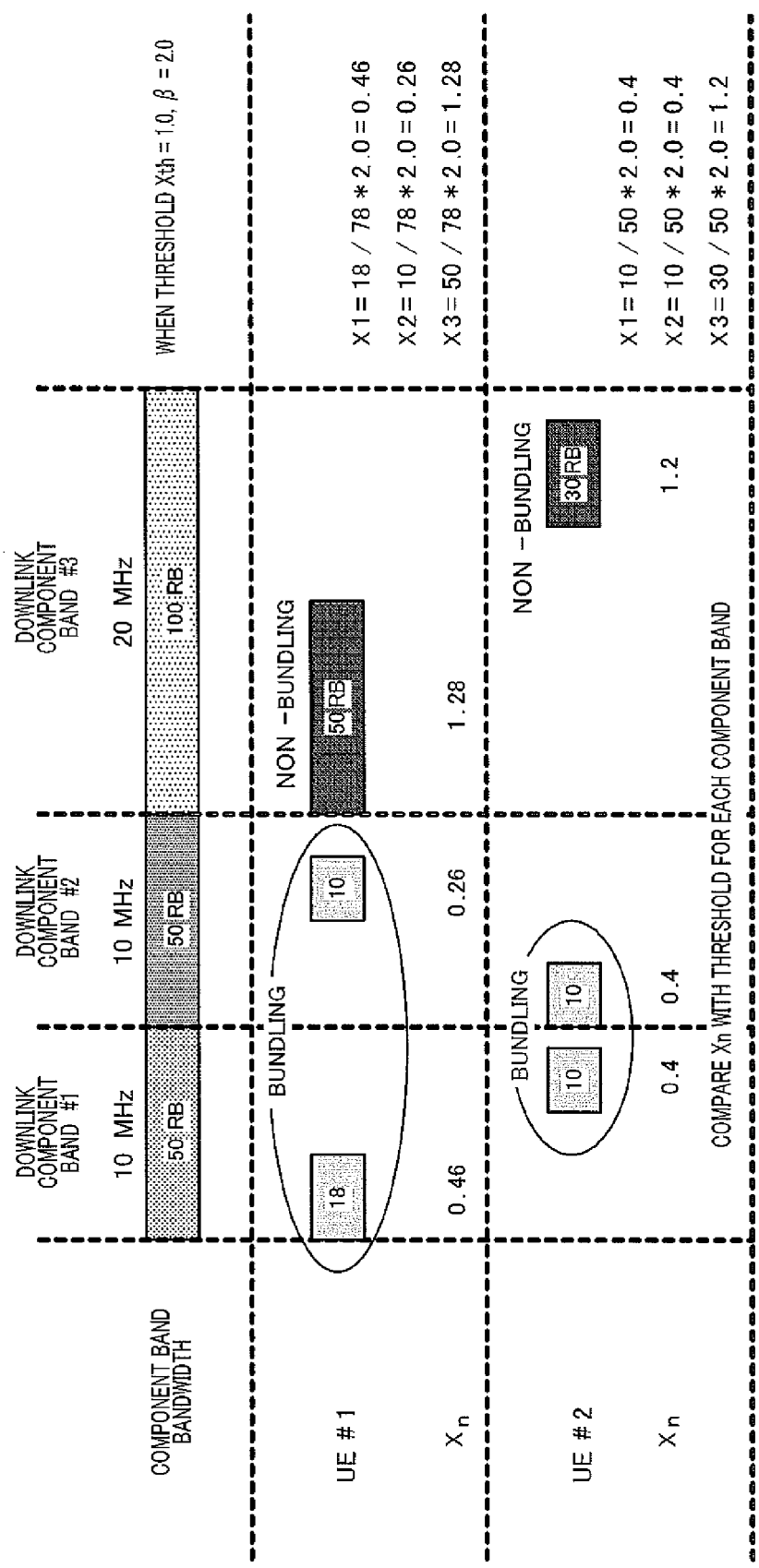
FIG. 8 is a diagram illustrating operation of a terminal and a base station according to Embodiment 2.

Next, operation of terminal 100 and base station 200 will be described using FIG. 8. The precondition in FIG. 8 is similar to that in FIG. 6.

Parameter calculation section 131 in terminal 100 calculates a "base station transmission parameter" based on resource allocation information. Here, the "base station transmission parameter" is calculated according to following equation 2.

$$Xn = (\text{number of allocated RBs in } n\text{-th band of terminal}) \div (\text{total number of RBs allocated in all bands of terminal}) \times \beta \quad \text{(Equation 2)}$$

That is, the ratio of resource quantities allocated to terminal 100 in an arbitrary downlink component band among three downlink component bands to the total resource quantities allocated to terminal 100, that is, a degree of distribution is calculated according to equation 2. Here, β in equation 2 is a parameter when calculating degree of distribution Xn. This β may be individually set for each cell, each terminal 100 or each downlink component band.

In FIG. 8, 18 RBs are allocated to first terminal 100 (UE#1) in downlink component band #1, 10 RBs are allocated in downlink component band #2 and 50 RBs are allocated in downlink component band #3. That is, the total resource quantities allocated to UE#1 in downlink component bands #1 to #3 as a whole is 78 MHz. Therefore, when β=2.0, degree of distribution Xn in downlink component bands #1 to #3 are 0.46, 0.26 and 1.28 respectively. Similarly, regarding second terminal 100 (UE#2), degree of distribution Xn in downlink component bands #1 to #3 are 0.4, 0.4 and 1.2 respectively.

Next, bundling determination section 132 compares the parameter value of the downlink component band calculated in parameter calculation section 131 with predetermined threshold Xth stored beforehand and determines whether or not to include the downlink component band in the bundling group based on this comparison result.

To be more specific, when threshold Xth=1.0, bundling determination section 132 in UE#1 includes downlink component band #1 and downlink component band #2 whose parameter value calculated in parameter calculation section 131 is equal to or below threshold Xth in the bundling group as shown in FIG. 8. On the other hand, bundling determination section 132 does not include downlink component band #3 whose parameter value calculated in parameter calculation section 131 is greater than threshold Xth in the bundling group.

Furthermore, when threshold Xth=1.0, bundling determination section 132 in UE#2 includes downlink component bands #1 and #2 in the bundling group since the parameter value calculated in parameter calculation section 131 is equal to or below threshold Xth in downlink component bands #1 and #2 as shown in FIG. 8.

Transmission band selection section 133 selects an uplink component band used to transmit the bundled response signal based on the bundling group information received from bundling determination section 132 and a selection rule. Here, a rule is used according to which an uplink component band corresponding to a downlink component band having the largest calculated parameter value is selected.

Here, when an error is detected even in one downlink component band in the bundling group as described above, retransmission is performed in all downlink component bands included in the bundling group, thus resulting in a problem that system throughput is degraded. By contrast, by including only downlink component bands whose degree of allocation Xn is equal to or below predetermined threshold Xth among the plurality of downlink component bands allocated to downlink communication directed to certain terminal 100 in the bundling group, downlink data for which a retransmission request is transmitted to base station 200 through a bundled response signal can be limited to data in a small size among the data directed to terminal 100 in question. Therefore, it is possible to minimize system throughput with respect to each terminal 100.

On the other hand, base station 200 receives a response signal transmitted from terminal 100 (including a bundled response signal and an unbundled response signal) and performs retransmission control according to the contents of the response signal. Here, base station 200 can identify the uplink component band and bundling group through which the bundled response signal is transmitted from terminal 100 using a method similar to the uplink component band determination method used to transmit the bundling group and the bundled response signal in terminal 100. Therefore, base station 200 handles the response signal received in the uplink component band as a bundled response signal, and can thereby perform retransmission control on downlink data in downlink component bands included in the bundling group based on the contents (ACK or NACK) of the bundled response signal.

Parameter β may be reported from base station 200 to terminal 100 as a specific value for each cell or may be reported as an offset value for each cell. Retransmission overhead and the amount of interference in PUCCH can be appropriately controlled for each cell in this way.

Furthermore, parameter β may also be reported from base station 200 to terminal 100 as a specific value for each terminal or may be reported as an offset value for each terminal. Retransmission overhead can be controlled appropriately for each terminal in this way.

Embodiment 3

As a "base station transmission parameter," Embodiment 3 uses total allocated resource quantities allocated to an arbitrary terminal with respect to a total bandwidth of a plurality of downlink component bands used for carrier aggregation, that is, an occupancy of the arbitrary terminal in all downlink component bands (group of component bands used) used in the arbitrary terminal. Thus, it is possible to prevent system throughput degradation while giving priority to a terminal carrying out large-volume communication.

The basic configurations of the base station and the terminal according to Embodiment 3 are common to those of Embodiment 1, and therefore these configurations will be described using FIGS. 2 to 5.

ACK/NACK transmission method control section 103 in terminal 100 of Embodiment 3 has a function similar to that of Embodiment 1. However, as described above, Embodiment 3 is different from Embodiment 1 in that the occupancy (that is, terminal occupancy) of terminal 100 in all of the plurality of downlink component bands used for carrier aggregation communication of terminal 100 is used as the "base station transmission parameter."

To be more specific, parameter calculation section 131 in ACK/NACK transmission method control section 103 calculates the "base station transmission parameter" based on resource allocation information. This parameter is terminal occupancy X of terminal 100.

The processing of bundling determination section 132, transmission band selection section 133 and bundling processing section 134 is similar to that of Embodiment 1 except that terminal occupancy X is used as criteria and whether or not to perform bundling is determined in terminal units.

ACK/NACK transmission method recognition section 207 in base station 200 of Embodiment 2 has a function similar to that of Embodiment 1. However, ACK/NACK transmission method recognition section 207 is different from Embodiment 1 in that terminal occupancy X is also used here as the "base station transmission parameter."

To be more specific, parameter calculation section 231 in ACK/NACK transmission method recognition section 207 calculates the "base station transmission parameter" based on resource allocation information. This parameter is terminal occupancy X of terminal 100.

The processing of bundling determination section 232, determined band selection section 233 and ACK/NACK processing section 234 is similar to that of Embodiment 1 except that terminal occupancy X of terminal 100 is used as criteria and whether or not to perform bundling is determined in terminal units.

Figure 9:
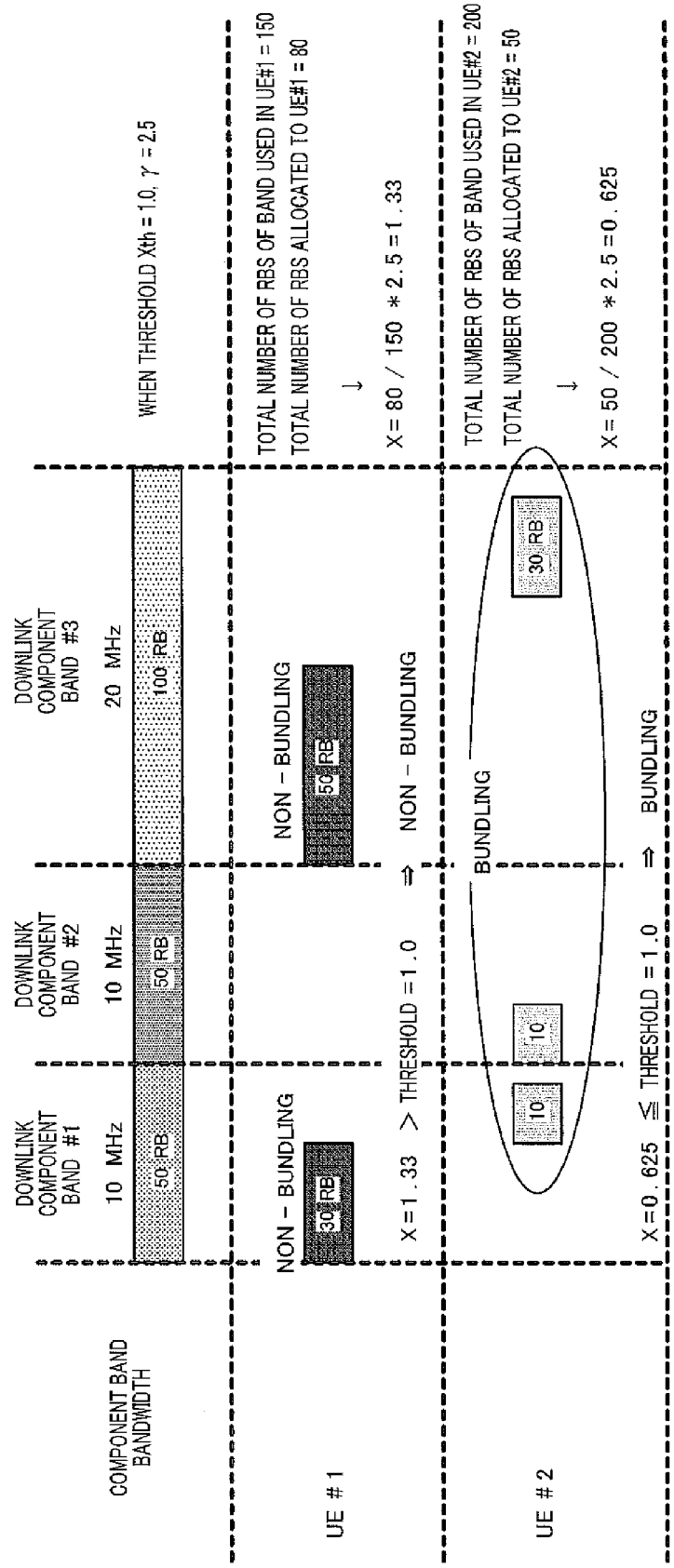
FIG. 9 is a diagram illustrating operation of a terminal and a base station according to Embodiment 3.

Next, operation of terminal 100 and base station 200 will be described using FIG. 9. The precondition in FIG. 9 is similar to that in FIG. 6.

Parameter calculation section 131 in terminal 100 calculates the "base station transmission parameter" based on resource allocation information. Here, the "base station transmission parameter" is calculated according to following equation 3.

$$X = \text{(total number of RBs allocated of data directed to terminal 100)} \div \text{(total number of RBs of band including data directed to terminal 100)} \times \gamma \quad \text{(Equation 3)}$$

That is, the ratio of total resource quantities allocated to terminal 100 to the total bandwidth of three downlink component bands, that is, a terminal occupancy of terminal 100 is calculated according to equation 3. Here, γ in equation 3 is a parameter used to calculate terminal priority X. This γ may be individually set for each cell, each terminal 100 or each downlink component band.

In FIG. 9, 30 RBs are allocated to first terminal 100 (UE#1) in downlink component band #1 and 50 RBs are allocated in downlink component band #3. That is, the total resource quantities allocated to UE#1 in downlink component bands #1 to #3 as a whole is 80 MHz. Therefore, when γ=2.5, the terminal occupancy of UE#1 is 1.33. Similarly, terminal priority is 0.625 with respect to second terminal 100 (UE#2).

Next, bundling determination section 132 compares the parameter value of the downlink component band calculated in parameter calculation section 131 with predetermined threshold Xth stored beforehand and determines whether or not to use bundling for the response method of terminal 100 based on this comparison result.

To be more specific, when threshold Xth=1.0, since terminal priority X is greater than threshold Xn as shown in FIG. 9, bundling determination section 132 in UE#1 determines not to use bundling for the response method.

Furthermore, when threshold Xth=1.0, since terminal priority X is less than threshold Xn, bundling determination section 132 in UE#2 determines to use bundling for the response method as shown in FIG. 9.

Transmission band selection section 133 selects an uplink component band used to transmit a bundled response signal based on the bundling group information received from bundling determination section 132 and a selection rule. Here, a rule is used according to which an uplink component band corresponding to a downlink component band having the largest calculated parameter value (occupancy Xn similar to that in Embodiment 1) is selected.

On the other hand, base station 200 receives a response signal transmitted from terminal 100 (including a bundled response signal and an unbundled response signal) as shown above and performs retransmission control according to the contents of the response signal. Here, base station 200 can identify the presence or absence of bundling in terminal 100 using a method similar to that of terminal 100.

Parameter γ may be reported from base station 200 to terminal 100 as a specific value for each cell or may be report as an offset value for each cell. Retransmission overhead and the amount of interference in PUCCH can be appropriately controlled for each cell in this way.

Furthermore, parameter γ may also be reported from base station 200 to terminal 100 as a specific value for each terminal or may be reported as an offset value for each terminal. Retransmission overhead can be appropriately controlled for each terminal in this way.

Embodiment 4

Embodiment 4 changes the value of threshold Xth (or parameters α, β and γ) according to the magnitude of CS resource density of a CS (Cyclic Shift) resource pattern used to multiplex an uplink control channel (PUCCH) also used to transmit a response signal. To be more specific, in the case of a pattern with a low CS resource density, interference is smaller, and therefore threshold Xth is lowered so that bundling is less applicable. This makes it possible to set an appropriate threshold according to the magnitude of interference in PUCCH without new signaling. The CS resource pattern to be actually used is instructed from the base station to the terminal.

Figure 10:
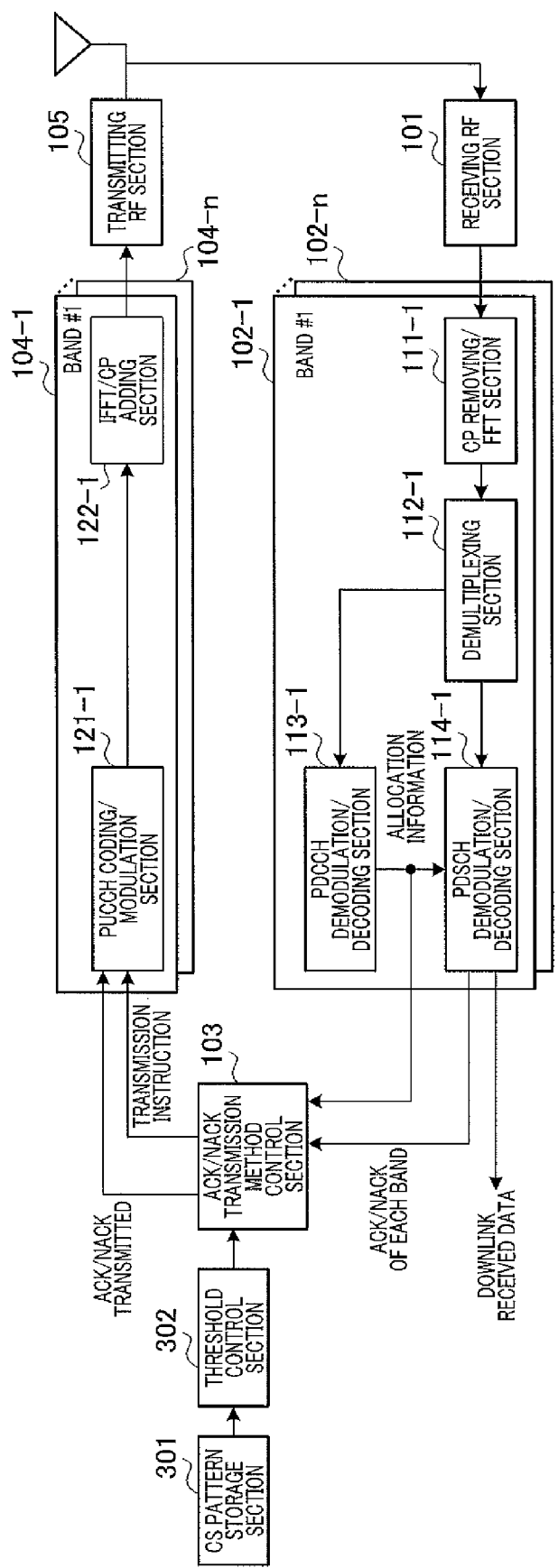
FIG. 10 is a block diagram showing a configuration of a terminal according to Embodiment 4 of the present invention.

FIG. 10 is a block diagram showing a configuration of terminal 300 according to Embodiment 4. In FIG. 10, terminal 300 includes CS pattern storage section 301 and threshold control section 302.

Figure 11:
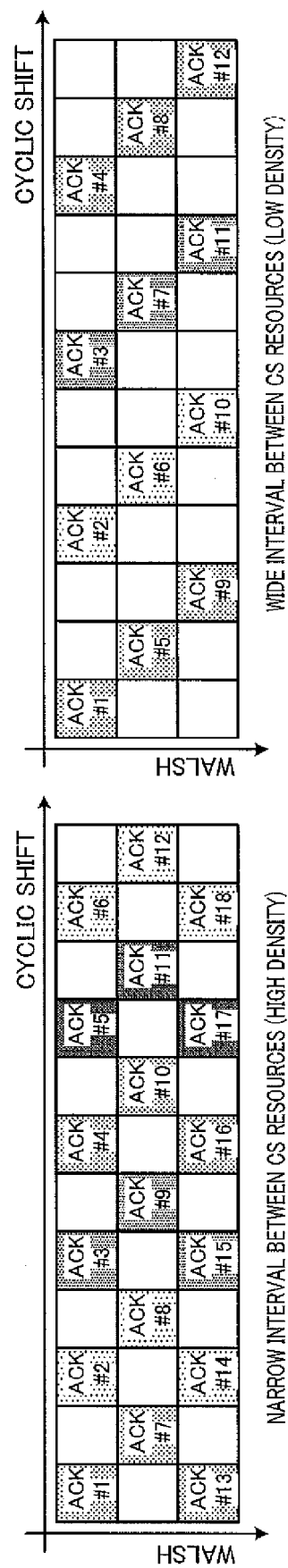
FIG. 11 is a diagram illustrating a CS resource pattern.

CS pattern storage section 301 stores CS resource patterns to be referenced when multiplexing PUCCH and values of CS resource densities in respective patterns. CS pattern storage section 301 outputs the density value of the CS resource pattern instructed from base station 400 which will be described later to threshold control section 302. FIG. 11 shows CS resource patterns. A high density CS resource pattern is shown on the left of FIG. 11 and a low density CS resource pattern is shown on the right.

Threshold control section 302 adjusts threshold Xth set in ACK/NACK transmission method control section 103 based on the density value of the CS resource pattern instructed from base station 400. To be more specific, when the density value of the CS resource pattern is small, threshold control section 302 adjusts threshold Xth to a lower level. On the other hand, when the density value of the CS resource pattern is large, threshold control section 302 adjusts threshold Xth to a higher level.

Figure 12:
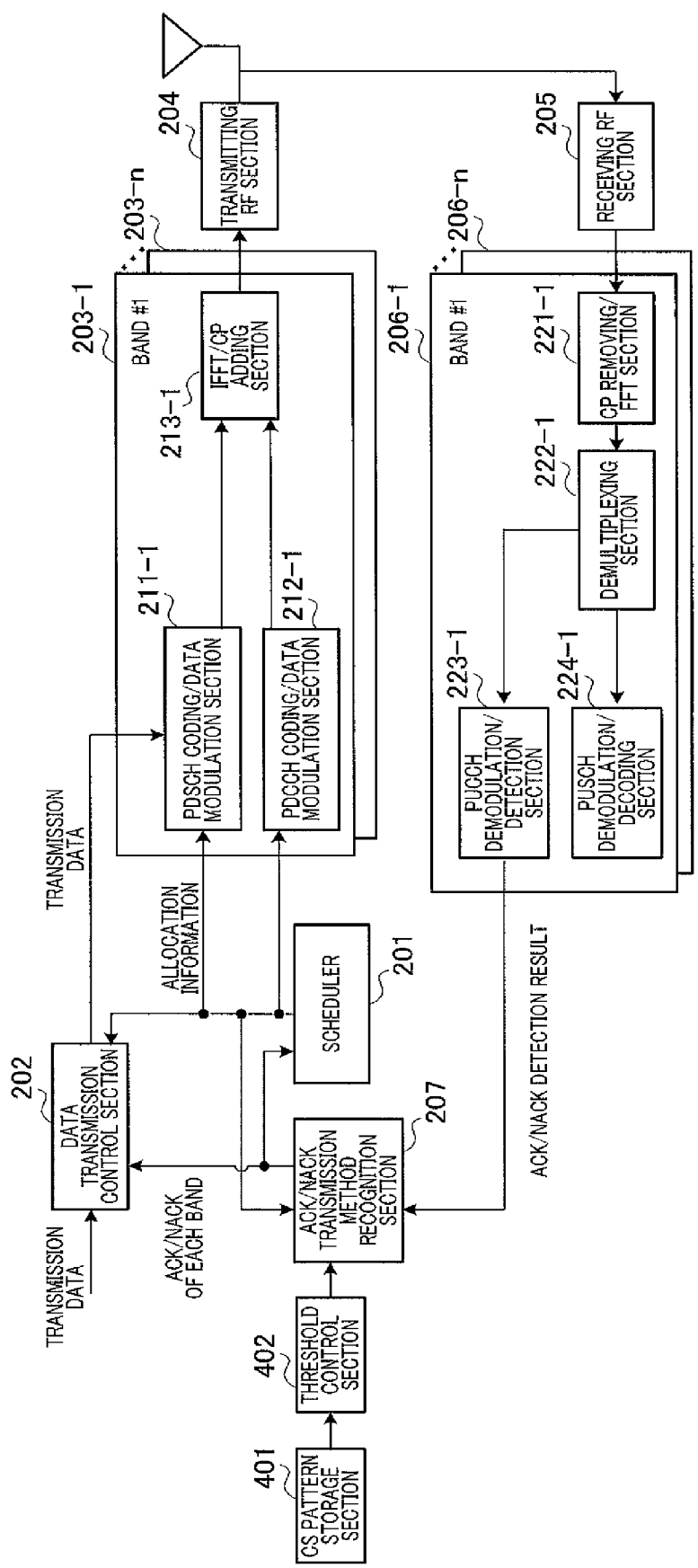
FIG. 12 is a block diagram showing a configuration of a base station according to Embodiment 4 of the present invention.

FIG. 12 is a block diagram showing a configuration of base station 400 according to Embodiment 4. In FIG. 12, base station 400 includes CS pattern storage section 401 and threshold control section 402.

CS pattern storage section 401 stores CS resource patterns to be referenced when multiplexing PUCCH and values of CS resource densities in respective patterns. CS pattern storage section 401 outputs a CS resource density value of a CS resource pattern instructed by base station 400 to terminal 300 to threshold control section 402.

Threshold control section 402 adjusts threshold Xth set in ACK/NACK transmission method recognition section 207 based on the density value of the CS resource pattern received from CS pattern storage section 401. To be more specific, when the density value of the CS resource pattern is small, threshold control section 402 adjusts threshold Xth to a smaller value. On the other hand, when the density value of the CS resource pattern is large, threshold control section 402 adjusts threshold Xth to a larger value.

Embodiment 5

Embodiment 5 identifies an uplink component band used to transmit a bundled response signal based on a specific ID number which differs from one terminal to another. That is, the terminal transmits a bundled response signal in an uplink component band corresponding to the ID number of the terminal. This makes it possible to cause ACK/NACK to averagely distribute to respective uplink component bands and prevent interferences from increasing in PUCCH in a specific uplink component band.

Figure 13:
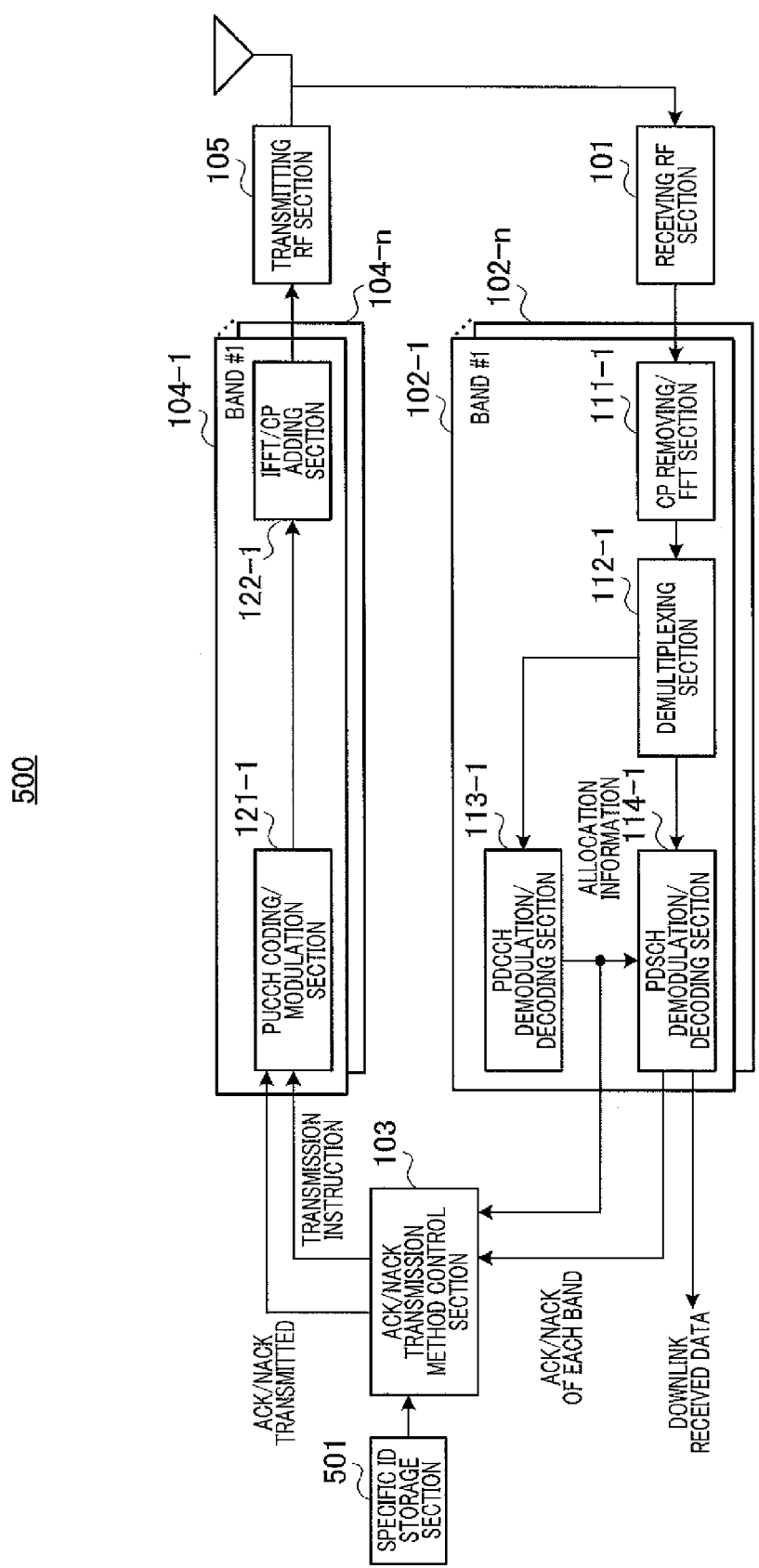
FIG. 13 is a block diagram showing a configuration of a terminal according to Embodiment 5 of the present invention.

FIG. 13 is a block diagram showing a configuration of terminal 500 according to Embodiment 5. In FIG. 13, terminal 500 includes specific ID storage section 501 that stores a terminal ID specific to each terminal reported beforehand from base station 600, which will be described later.

ACK/NACK transmission method control section 103 determines an uplink component band used to transmit a bundled response signal based on the terminal ID of terminal 500 received from specific ID storage section 501 and the bundling information received from bundling determination section 132.

For example, ACK/NACK transmission method control section 103 calculates the number of the uplink component band used to transmit the bundled response signal using following equation 4.

$$M = ((\text{terminal-specific ID}) \bmod (\text{number of bands to be bundled})) + 1 \quad \text{(Equation 4)}$$

For example, CRNTI (Connection Radio Network Temporary Identify) can be used as the terminal-specific ID number.

Figure 14:
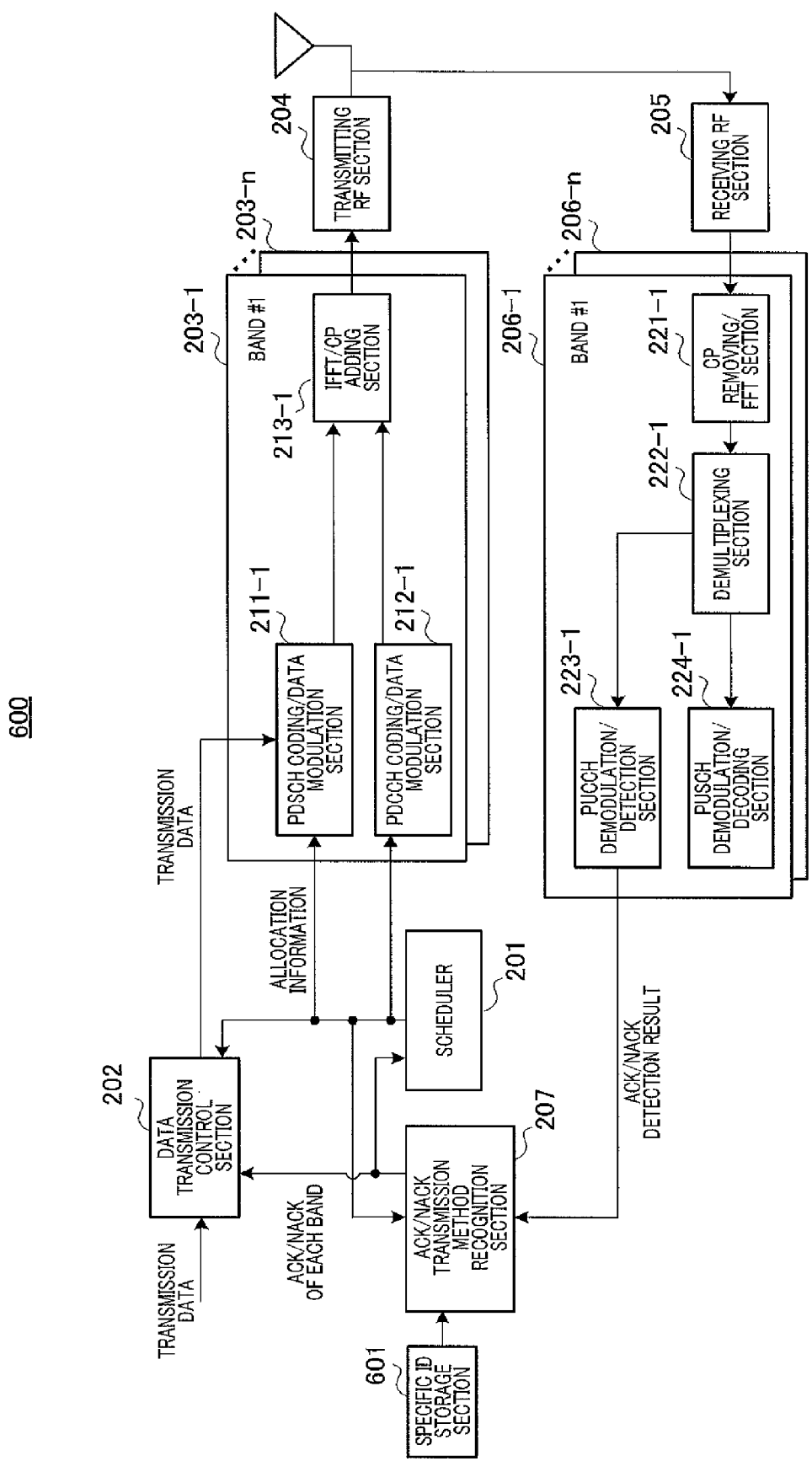
FIG. 14 is a block diagram showing a configuration of a base station according to Embodiment 5 of the present invention.

FIG. 14 is a block diagram showing a configuration of base station 600 according to Embodiment 5. In FIG. 14, base station 600 includes specific ID storage section 601 that stores each terminal specific terminal ID reported to each terminal.

ACK/NACK transmission method recognition section 207 identifies an uplink component band used by terminal 100 to transmit the bundled response signal based on the terminal ID received from specific ID storage section 601 and the bundling information received from bundling determination section 232 using above-described equation 4.

Embodiment 6

Embodiment 6 uses a transport block (TB) size instead of the number of RBs. That is, the TB size can be used as the resource allocation information. The TB size represents the number of bits of data before addition of error correction (that is, CRC check target data) and is reported from the base station to the terminal for each downlink component band through PDCCH.

To be more specific, regarding the aspect described in Embodiment 1, the present embodiment can obtain effects similar to those of Embodiment 1 using the TB size as is, instead of the occupancy of the number of RBs as the "base station transmission parameter."

Furthermore, regarding the aspect described in Embodiment 2, the present embodiment can obtain effects similar to those of Embodiment 2 by calculating the degree of distribution of each downlink component band using the TB size instead of the number of RBs and using this as the "base station transmission parameter."

Furthermore, regarding the aspect described in Embodiment 3, the present embodiment can obtain effects similar to those of Embodiment 3 using the total TB size as is, instead of the occupancy of the total number of RBs as the "base station transmission parameter."

Other Embodiments (1) In each of the above embodiments, the number of RBs itself may be used as the "base station transmission parameter."

(2) The techniques described in Embodiments 1 to 3 may be used singly or may be used in an arbitrary combination.

(3) Terminal occupancy X in Embodiment 3 may also be calculated according to following equation 5. That is, terminal occupancy X may be a mean value of the terminal occupancy of each downlink component band.

$$X = \Sigma((\text{number of RBs allocated in } n\text{-th band}) \div (\text{total number of RBs of } n\text{-th band})) \div N \times \gamma \quad \text{(Equation 5)}$$

(4) Each of the above embodiments has been described on the assumption that all PDCCHs have been received successfully. However, if there is actually a downlink component band that cannot receive PDCCH, a mismatch in resource allocation information may occur between the base station and the terminal. That is, there may be cases where the ACK/NACK transmission method cannot be determined. The method for solving this problem will be described below.

The terminal determines whether or not all PDSCHs directed to the terminal have been successfully received using DAI (Downlink Assignment Index) information indicating the number of pieces of allocated downlink data included in PDCCHs.

When there is a downlink component band that has not successfully received PDCCH, the terminal individually transmits ACK/NACK of all downlink component bands without bundling. At this time, NACK is transmitted as a response signal of the downlink component band that has not successfully received PDCCH.

Upon receiving a response signal through PUCCH of an uplink component band that must not have been transmitted when bundling transmission is performed, the base station makes a DTX determination, and can thereby detect that the terminal has failed to receive PDCCH of a downlink component band corresponding to the uplink component band. That is, upon detecting, through DTX determination, ACK/NACK that must not have been transmitted, the terminal discovers the fact that there has been a downlink component band that has not received PDCCH. Therefore, if the base station detects that the terminal has not received PDCCH, the base station recognizes that a response signal unbundled in all uplink component bands has been transmitted from the terminal side and performs reception processing on the response signal.

When transmitting DAI, DAI may be added to only PDCCH of a downlink component band to be bundled. In this case, information on the presence or absence of PDCCH is reported only in the downlink component band to be bundled. This makes it possible to reduce overhead and reduce the number of DAI bits according to the number of bands to be bundled.

Furthermore, when transmitting DAI, DAI may also be added to PDCCHs of all bands irrespective of whether or not those bands are to be bundled. In this case, it is possible to report information on the presence or absence of PDCCH on all downlink component bands through DAI. That is, DAI can be reported in a downlink component band that is not to be bundled assuming that there is no PDCCH. This allows a common PDCCH format to be used irrespective of the number of bands to be bundled. As a result, since common processing is performed no matter what the PDCCH transmission situation may be, it is possible to simplify the processing of the base station and terminal.

(5) The base station may determine whether or not to perform bundling based on the allocated resource information using a method similar to those in Embodiments 1 to 4 and signal information indicating whether or not to perform bundling on all downlink component bands to the terminal through PDCCH of each downlink component band. In this case, since bundling can be preferentially performed on a response signal for data with small allocated resource quantities, it is possible to obtain an effect of reducing increases in retransmission overhead caused by bundling.

Here, the base station may determine a downlink component band to be bundled and report it to the terminal through RRC signaling. This makes it possible to report whether or not each downlink component band is to be bundled to an arbitrary terminal according to the situation of use or channel situation.

Furthermore, the base station may determine a downlink component band to be bundled and report it to the terminal using broadcast information. This reporting method can be used especially when determining a downlink component band to be bundled according to a cell environment. This method allows common information to be reported to all terminals, and can thereby reduce the amount of signaling.

Furthermore, the base station may determine whether or not to perform bundling based on the allocated resource information using a method similar to those in Embodiments 1 to 4 and signal information on the transmission band to the terminal using PDCCH. At this time, since a PUCCH resource of an uplink component band corresponding to the downlink component band having a high occupancy of allocated resources is selected and a bundled response signal is transmitted using this PUCCH resource, it is possible to obtain an effect of suppressing increases in the number of ACK/NACKs (amount of interference among PUCCH resources) in a specific uplink component band.

(6) Although cases have been described with the above embodiments as examples where the present invention is configured by hardware, the present invention can also be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-023308, filed on Feb. 4, 2010, including the specification, drawings and abstract is incorporated herein by reference in its entirety.

INDUSTRIAL APPLICABILITY

The terminal, base station, response method and retransmission control method of the present invention are useful as those capable of switching a response signal transmission method while preventing throughput degradation and without increasing the number of signaling bits.

REFERENCE SIGNS LIST 100, 300, 500 terminal
101, 205 receiving RF section
102, 206 reception processing section
103 ACK/NACK transmission method control section
104, 203 transmission processing section
105, 204 transmitting RF section
111, 221 CP removing/FFT section
112, 222 demultiplexing section
113 PDCCH demodulation/decoding section
114 PDSCH demodulation/decoding section
121 PUCCH coding/modulation section
122, 213 IFFT/CP adding section
131, 231 parameter calculate section
132, 232 bundling determination section
133 transmission band selection section
134 bundling processing section
200, 400, 600 base station
201 scheduler
202 data transmission control section 202
207 ACK/NACK transmission method recognition section
211 PDSCH coding/data modulation section
212 PDCCH coding/data modulation section
223 PUCCH demodulation/detection section
224 PUSCH demodulation/decoding section
233 determined band selection section
234 ACK/NACK processing section
301, 401 CS pattern storage section
302, 402 threshold control section
501, 601 specific ID storage section

The invention claimed is:

1. A terminal comprising:
a receiver configured to receive downlink data in a plurality of downlink component bands;
an error detector configured to detect an error in each of the downlink data;
a bundling group determination section configured to determine downlink component bands that are included in a bundling group and downlink component bands that are not included in the bundling group from among the plurality of downlink component bands, based on a parameter that indicates resource quantity allocated to the terminal by a base station; and
a response signal forming section configured to form a bundled response signal into which error detection results on downlink data of the downlink component bands included in the bundling group are bundled.

2. The terminal according to claim 1, wherein the parameter is occupancy of resources allocated to the terminal in each of the plurality of downlink component bands.

3. The terminal according to claim 1, wherein the parameter is occupancy of resources allocated to the terminal in each of the plurality of downlink component bands with respect to all resources allocated to the terminal in the plurality of downlink component bands.

4. The terminal according to claim 1, wherein the parameter is occupancy of the total resource quantities allocated to the terminal in the plurality of downlink component bands with respect to the total resource quantities in the plurality of downlink component bands.

5. The terminal according to claim 1, wherein the parameter is the number of resource blocks allocated to the terminal in each of the plurality of downlink component bands.

6. The terminal according to claim 1, wherein the parameter is a size of a transport block used to transmit downlink data directed to the terminal in each of the plurality of downlink component bands.

7. The terminal according to claim 1, wherein the parameter is a total size of transport blocks used to transmit downlink data directed to the terminal in the plurality of downlink component bands.

8. The terminal according to claim 1, wherein the bundling group determination section compares the parameter with a threshold and determines the bundling group based on the comparison result, and
the terminal further comprises:
a transmitter configured to transmit the bundled response signal using an uplink control channel having a plurality of patterns with different cyclic shift resource densities, and
a threshold adjuster configured to adjust the threshold according to a cyclic shift resource density of a pattern used by the transmitter.

9. The terminal according to claim 1, further comprising:
a transmission band determination section configured to determine an uplink component band corresponding to a downlink component band having the largest parameter value among the downlink component bands included in the bundling group, as an uplink component band used to transmit the bundled response signal.

10. The terminal according to claim 1, further comprising:
a transmission band determination section configured to determine an uplink component band used to transmit the bundled response signal based on an ID specific to the terminal.

11. A base station comprising:
a transmitter configured to transmit downlink data to a terminal in a plurality of downlink component bands;
a bundling group identification section configured to identify downlink component bands that are included in a bundling group and downlink component bands that are not included in the bundling group from among the plurality of downlink component bands, based on a parameter that indicates resource quantity allocated to the terminal; and
a receiver configured to receive a bundled response signal into which error detection results in the bundling group are bundled by the terminal.

12. The base station according to claim 11, wherein the parameter is occupancy of resources allocated to the terminal in each of the plurality of downlink component bands.

13. The base station according to claim 11, wherein the parameter is occupancy of resources allocated to the terminal in each of the plurality of downlink component bands with respect to all resources allocated to the terminal in the plurality of downlink component bands.

14. The base station according to claim 11, wherein the parameter is occupancy of total resource quantities allocated to the terminal in the plurality of downlink component bands with respect to the total resource quantities in the plurality of downlink component bands.

15. The base station according to claim 11, wherein the parameter is the number of resource blocks allocated to the terminal in each of the plurality of downlink component bands.

16. The base station according to claim 11, wherein the parameter is a size of a transport block used to transmit downlink data directed to the terminal in each of the plurality of downlink component bands.

17. The base station according to claim 11, wherein the parameter is a total size of transport blocks used to transmit downlink data directed to the terminal in the plurality of downlink component bands.

18. The base station according to claim 11, further comprising:
- a band identification section configured to identify an uplink component band corresponding to a downlink component band having the largest parameter value among the downlink component bands included in the bundling group, as an uplink component band in which the bundled response signal is transmitted from the terminal.

19. A response method comprising:
- receiving downlink data in a plurality of downlink component bands;
- detecting an error in each of the downlink data;
- determining downlink component bands that are included in a bundling group and downlink component bands that are not included in the bundling group from among the plurality of downlink component bands, based on a parameter that indicates resource quantity allocated to the terminal by a base station; and
- forming a bundled response signal into which error detection results on downlink data of the downlink component bands included in the bundling group are bundled.

20. A retransmission control method comprising:
- transmitting downlink data to a terminal in a plurality of downlink component bands;
- identifying downlink component bands that are included in a bundling group and downlink component bands that are not included in the bundling group from among the plurality of downlink component, bands based on a parameter that indicates resource quantity allocated to the terminal; and
- receiving a bundled response signal into which error detection results in the bundling group are bundled by the terminal.

* * * * *